US010541064B2

(12) United States Patent
Lee et al.

(10) Patent No.: US 10,541,064 B2
(45) Date of Patent: Jan. 21, 2020

(54) SIC POWDER, SIC SINTERED BODY, SIC SLURRY AND MANUFACTURING METHOD OF THE SAME

(71) Applicant: KOREA INSTITUTE OF MACHINERY & MATERIALS, Yuseong-gu Daejeon (KR)

(72) Inventors: Sea Hoon Lee, Changwon-si (KR); Bola Yoon, Busan (KR); Jin Myung Kim, Changwon-si (KR)

(73) Assignee: KOREA INSTITUTE OF MACHINERY & MATERIALS, Yuseong-Gu, Daejeon (KR)

( * ) Notice: Subject to any disclaimer, the term of this patent is extended or adjusted under 35 U.S.C. 154(b) by 135 days.

(21) Appl. No.: 15/363,147

(22) Filed: Nov. 29, 2016

(65) Prior Publication Data
US 2017/0076835 A1    Mar. 16, 2017

Related U.S. Application Data

(63) Continuation of application No. PCT/KR2015/010931, filed on Oct. 15, 2015.

(30) Foreign Application Priority Data

Jul. 29, 2015  (KR) .......................... 10-2015-0107378
Oct. 15, 2015  (KR) .......................... 10-2015-0144254

(51) Int. Cl.
*H01B 1/04*      (2006.01)
*C04B 35/565*    (2006.01)
*B01F 17/00*     (2006.01)
*C04B 35/63*     (2006.01)
*C04B 35/64*     (2006.01)
*H01B 1/24*      (2006.01)

(52) U.S. Cl.
CPC ............. *H01B 1/04* (2013.01); *B01F 17/005* (2013.01); *B01F 17/0007* (2013.01); *B01F 17/0042* (2013.01); *B01F 17/0085* (2013.01); *C04B 35/565* (2013.01); *C04B 35/6303* (2013.01); *C04B 35/64* (2013.01); *H01B 1/24* (2013.01); *C04B 2235/3817* (2013.01); *C04B 2235/3821* (2013.01); *C04B 2235/3826* (2013.01)

(58) Field of Classification Search
CPC ........ H01B 1/04; H01B 1/24; C04B 35/6263; C04B 35/62685; C04B 35/6261; C04B 35/645; C04B 35/64; C04B 35/6303; C04B 35/565; C04B 35/575; C04B 2235/6567; C04B 2235/549; C04B 2235/5472; C04B 2235/5445; C04B 2235/424; C04B 2235/421; C04B 2235/402; C04B 2235/3834; C04B 2235/3418; C04B 2235/96; C04B 2235/666; C04B 2235/77; C04B 2235/3821; C04B 2235/3826; C04B 2235/3817; B01F 17/0085; B01F 17/0042; B01F 17/005; B01F 17/0007
USPC ........................................................ 252/516
See application file for complete search history.

(56) References Cited

U.S. PATENT DOCUMENTS

| 5,272,121 | A | * | 12/1993 | Mizutani | ............... | C04B 35/575 |
| | | | | | | 501/88 |
| 5,298,470 | A | * | 3/1994 | Chia | ..................... | C04B 35/575 |
| | | | | | | 501/89 |
| 5,322,824 | A | * | 6/1994 | Chia | ..................... | C04B 35/565 |
| | | | | | | 252/516 |
| 5,672,435 | A | * | 9/1997 | Born | ..................... | C22C 1/1036 |
| | | | | | | 257/E23.009 |
| 8,999,457 | B2 | * | 4/2015 | Kirby | ..................... | C04B 41/009 |
| | | | | | | 427/140 |
| 9,096,474 | B2 | * | 8/2015 | Lee | ........................ | C04B 35/56 |
| 2009/0188701 | A1 | * | 7/2009 | Tsuzuki | .................. | C09K 5/14 |
| | | | | | | 174/252 |
| 2009/0318280 | A1 | * | 12/2009 | Mohammadi | ......... | C04B 35/563 |
| | | | | | | 501/87 |
| 2014/0065051 | A1 | * | 3/2014 | Kubota | ................. | C01B 32/956 |
| | | | | | | 423/345 |
| 2014/0272446 | A1 | * | 9/2014 | Zheng | ................... | B32B 15/043 |
| | | | | | | 428/545 |

(Continued)

FOREIGN PATENT DOCUMENTS

| CN | 103360039 A | * | 10/2013 |
| JP | 2001-97778 A | | 4/2001 |
| KR | 10-2002-0019129 A | | 3/2002 |

(Continued)

OTHER PUBLICATIONS

Yukio Takeda et al., "Effects of Elemental Additives on Electrical Resistivity of Silicon Carbide Ceramics", J. Am. Ceram. Soc., 70 [10], C206-C267 (1987). (Year: 1987).*

(Continued)

*Primary Examiner* — Douglas J Mc Ginty
(74) *Attorney, Agent, or Firm* — Myers Wolin, LLC.

(57) ABSTRACT

A method of manufacturing a silicon carbide (SiC) sintered body and a SiC sintered body obtained by the method are provided. The method includes: preparing a composite powder by subjecting a SiC raw material and a sintering aid raw material to mechanical alloying; and sintering the composite powder, wherein the sintering aid is at least one selected from the group consisting of an Al—C-based material, an Al—B—C-based material, and a B—C-based material. Accordingly, a SiC sintered body that can be sintered at low temperature, can be densified, and has high strength and high electrical conductivity can be prepared.

6 Claims, 26 Drawing Sheets

(56) References Cited

U.S. PATENT DOCUMENTS

2016/0122251 A1* 5/2016 Hinoki ............... C01B 21/0648
501/88

FOREIGN PATENT DOCUMENTS

| KR | 10-2010-0118835 A | 11/2010 |
| KR | 10-2012-0086207 A | 8/2012 |
| KR | 10-2013-0071564 A | 7/2013 |

OTHER PUBLICATIONS

International Search Report issued for corresponding International Patent Application No. PCT/KR2015/010931, dated Jul. 29, 2015.

* cited by examiner

[Fig. 1]
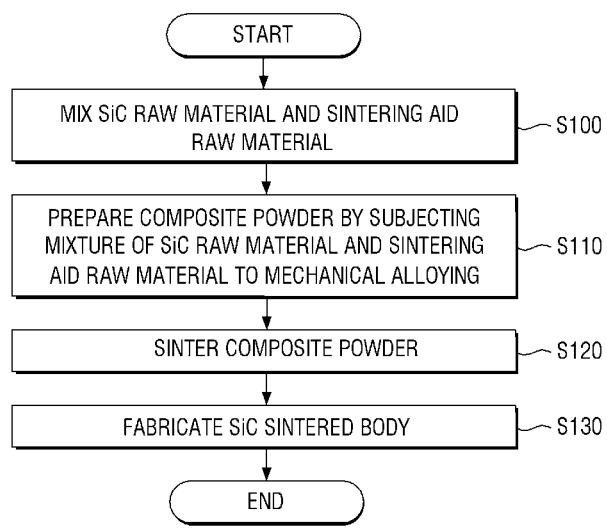

[Fig. 2]
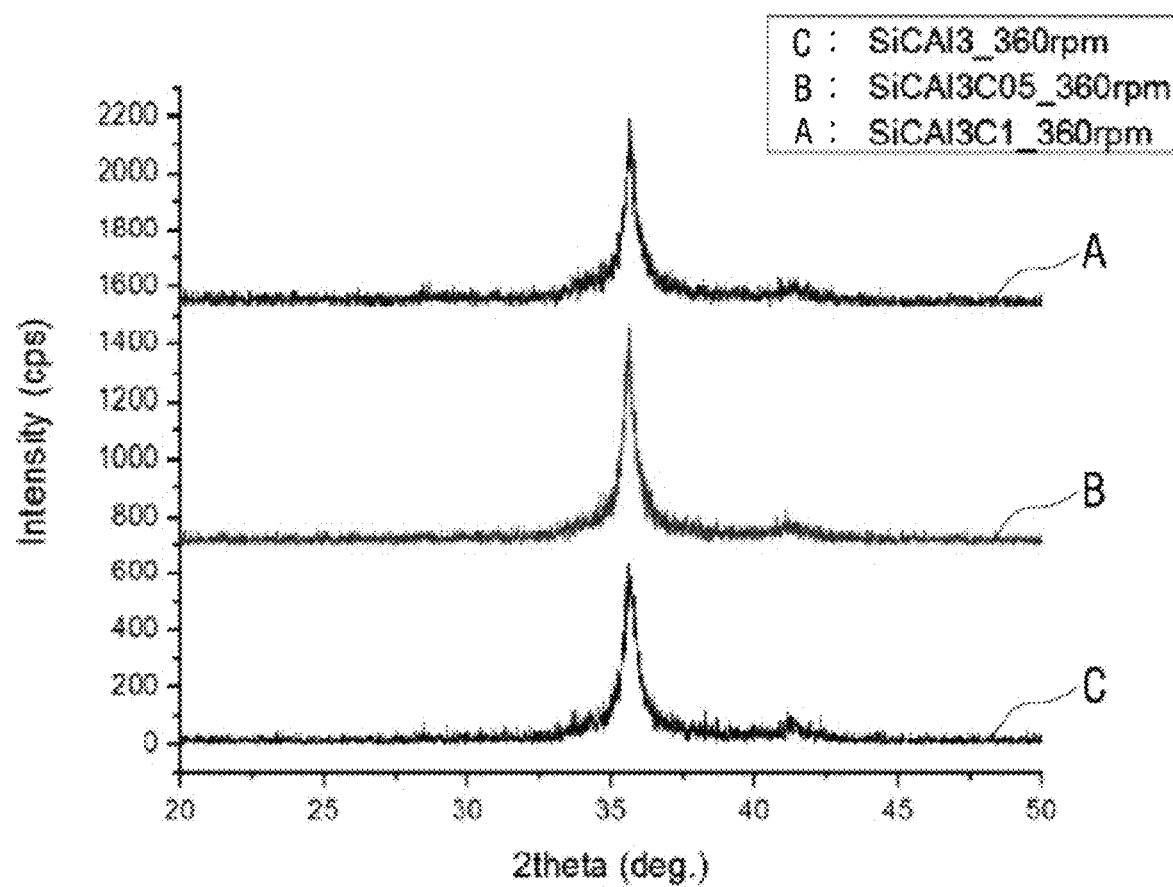

[Fig. 3]
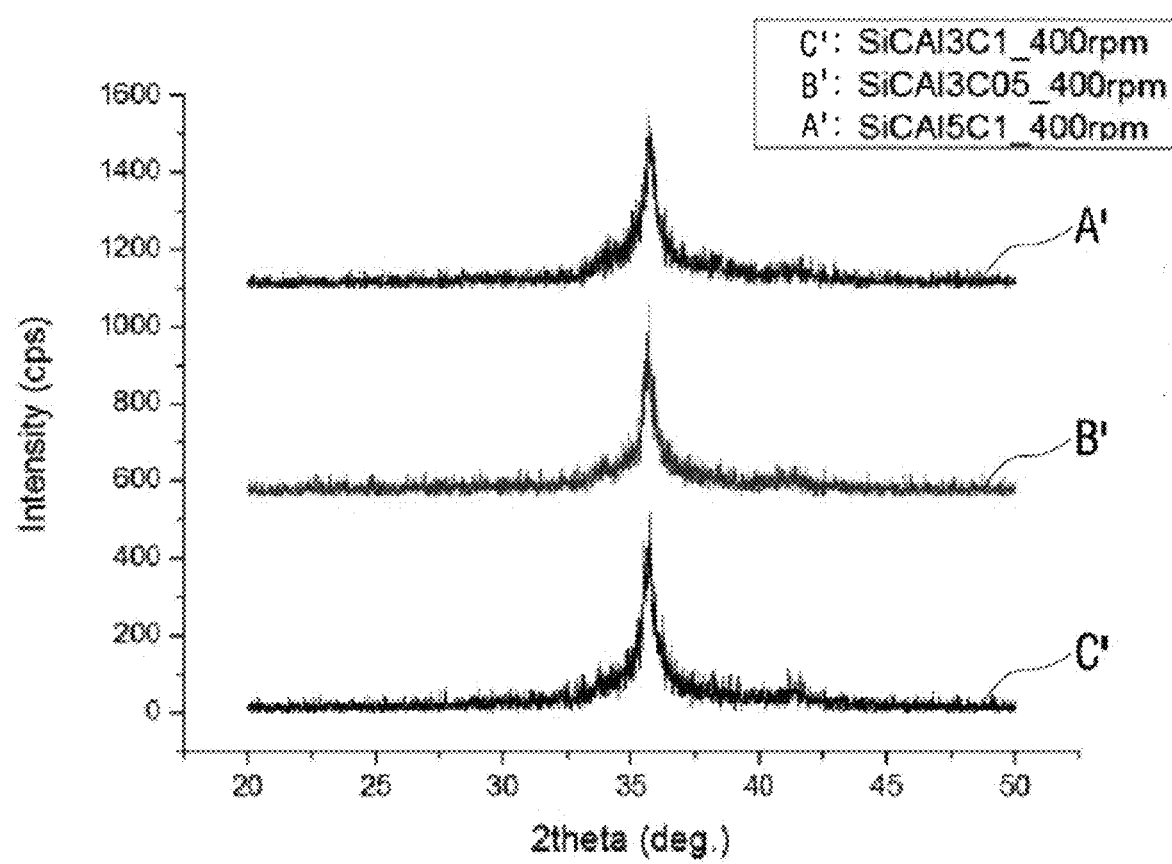

[Fig. 4]
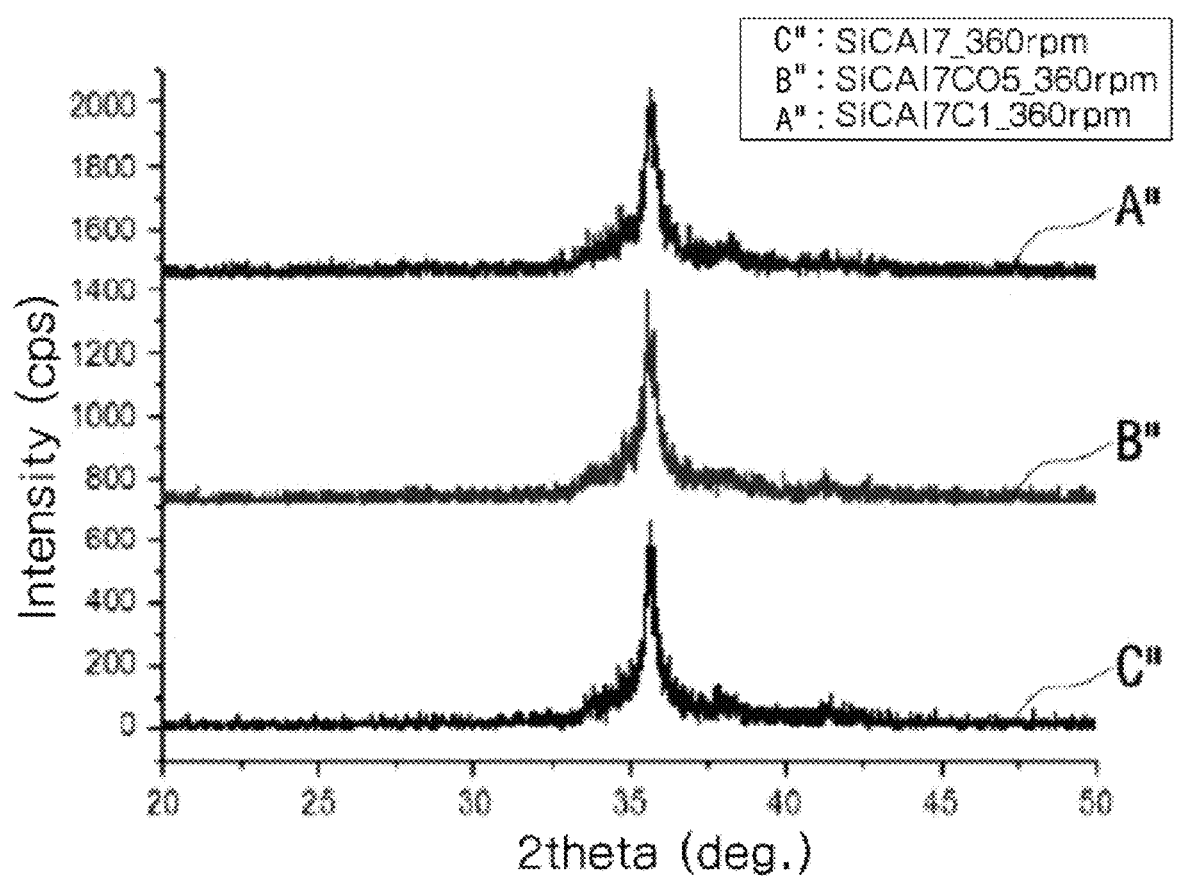

[Fig. 5]
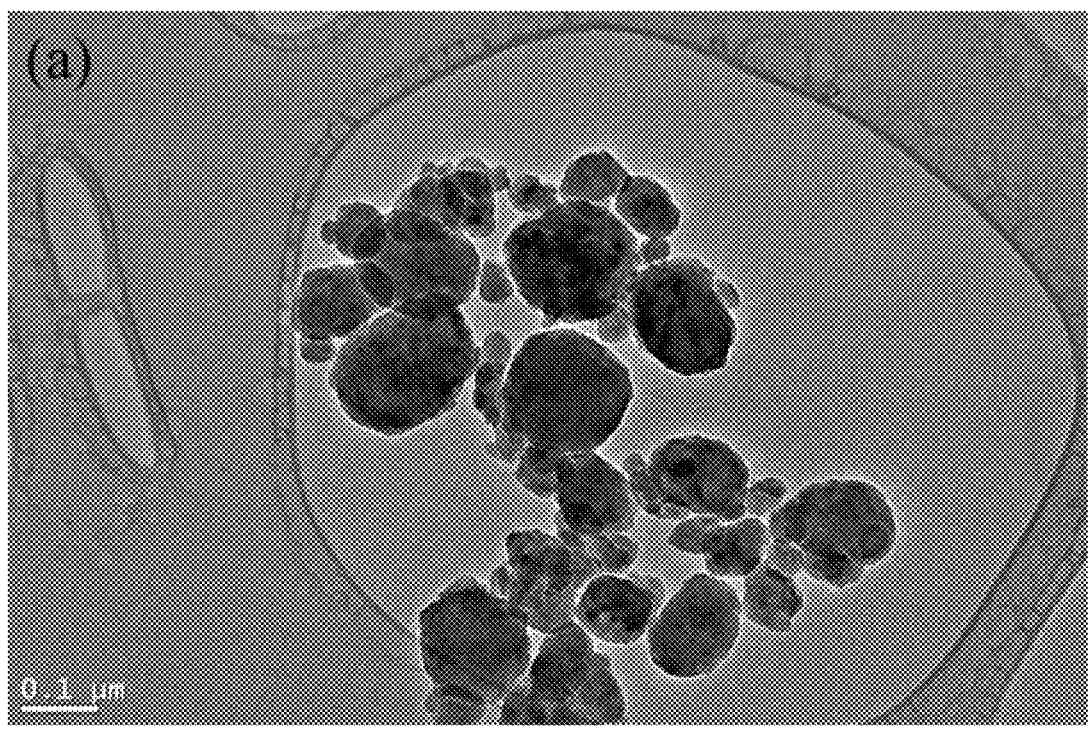

[Fig. 6]
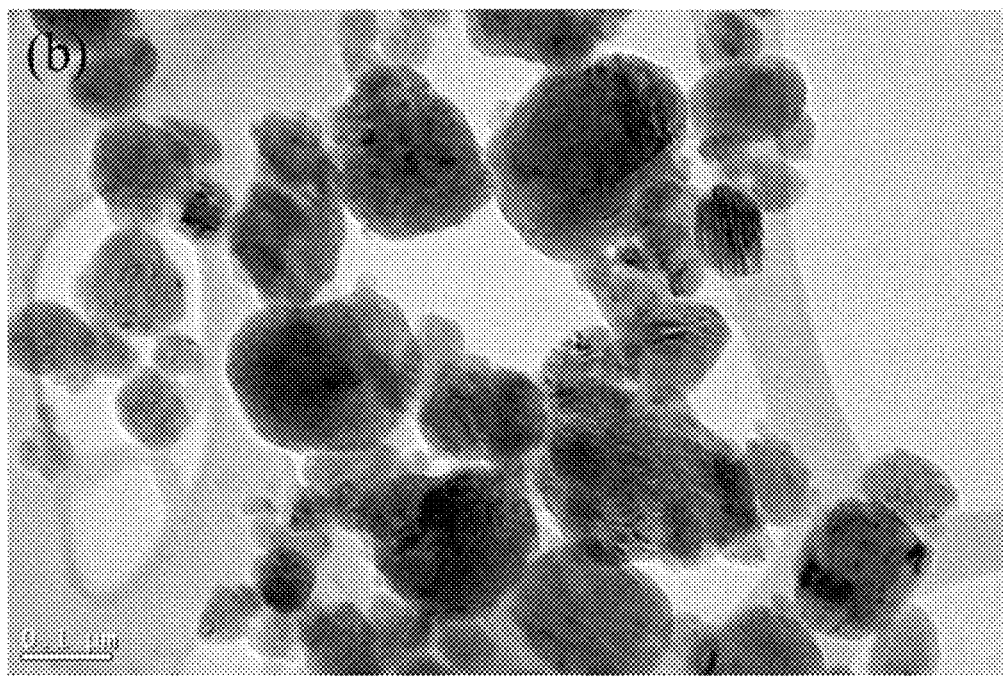

[Fig. 7]
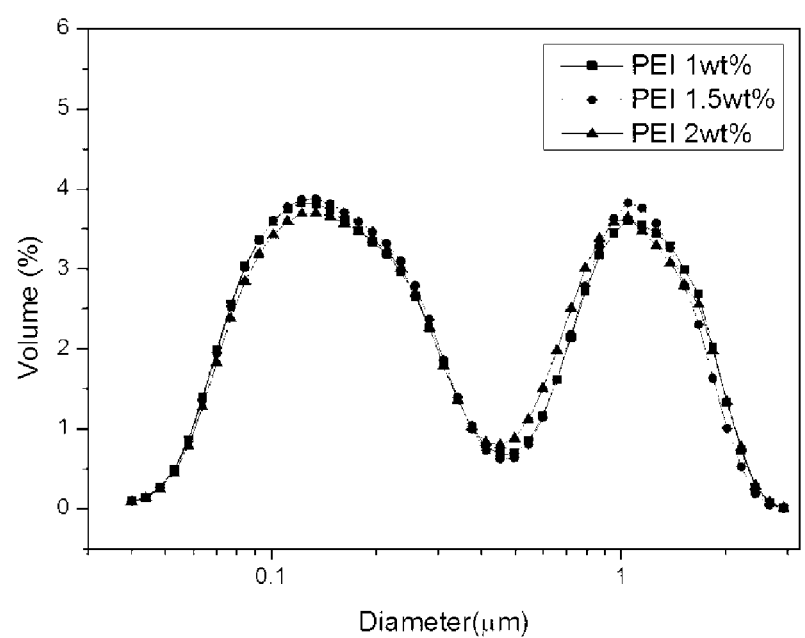

[Fig. 8]
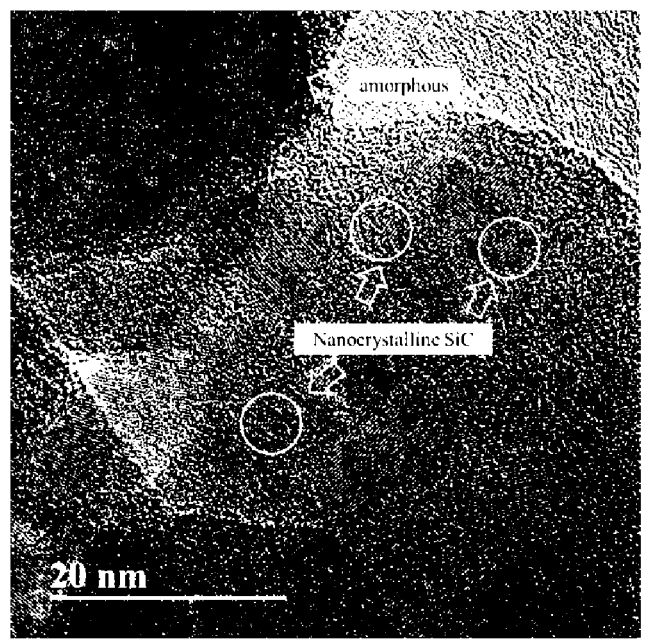
[Fig. 9]
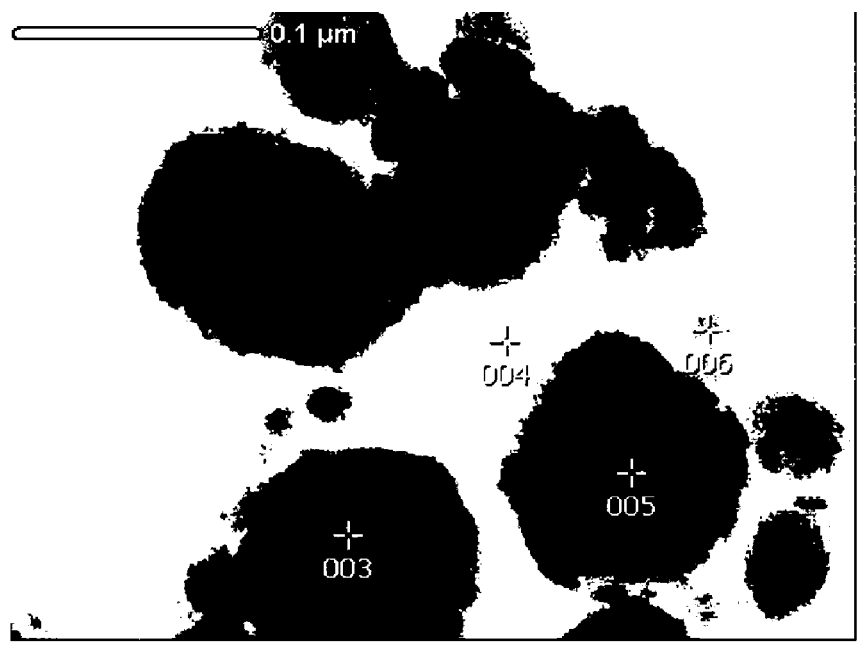

[Fig. 10]
[Fig. 11]
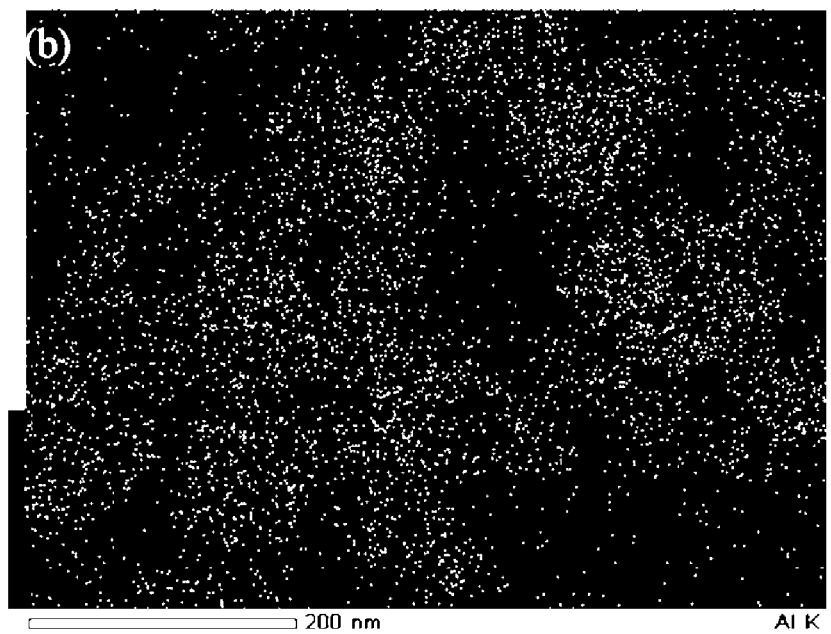

[Fig. 12]
[Fig. 13]
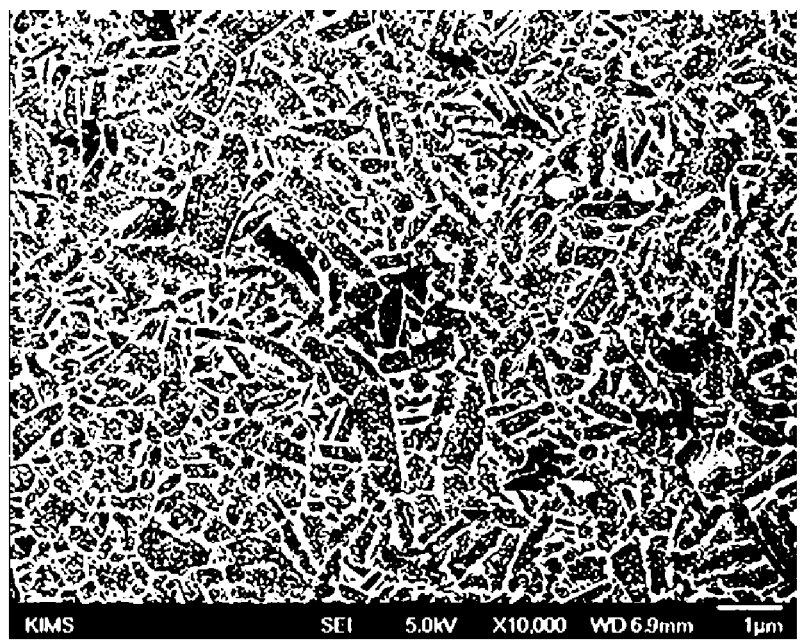

[Fig. 14]
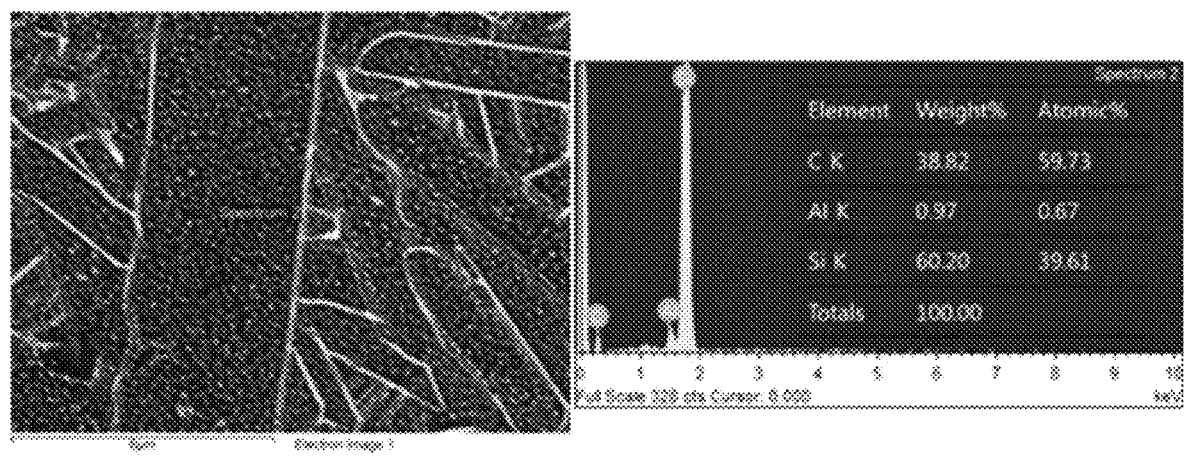

[Fig. 15]
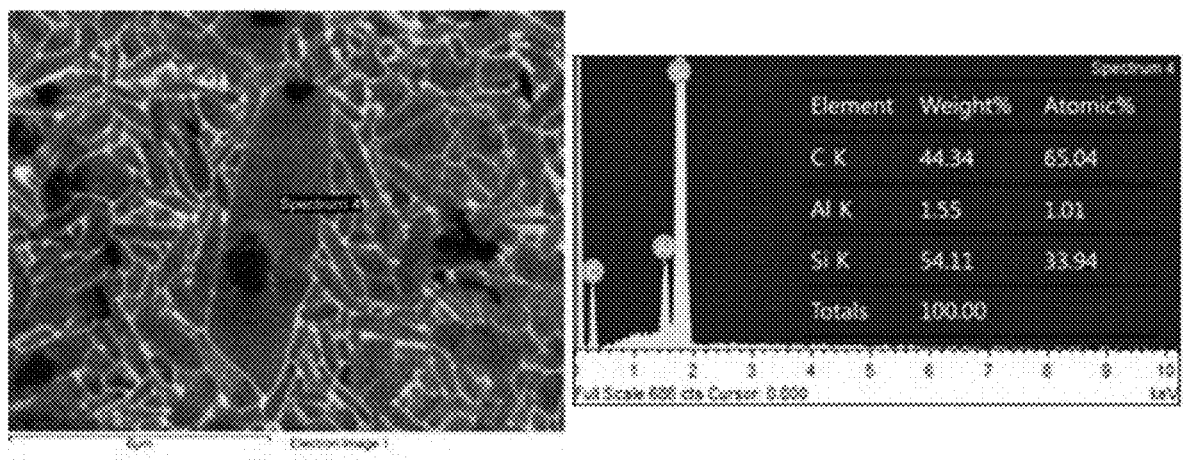

[Fig. 16]
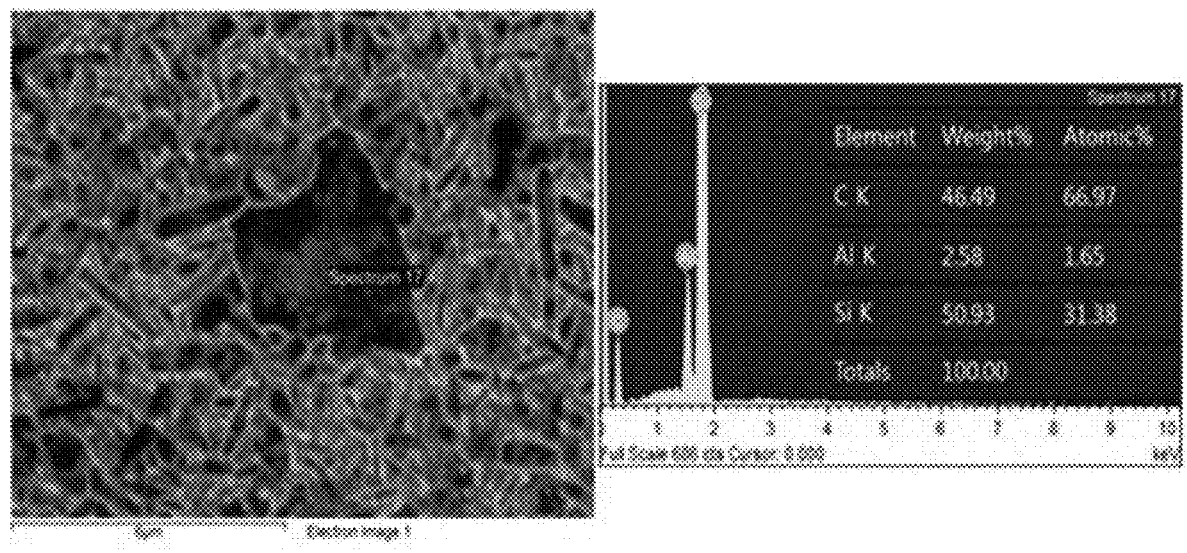

[Fig. 17]
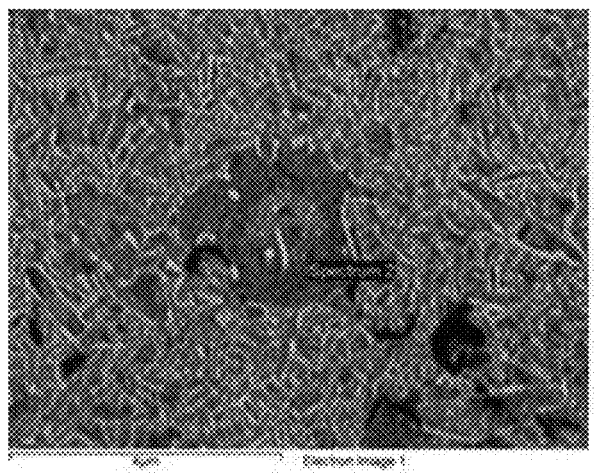 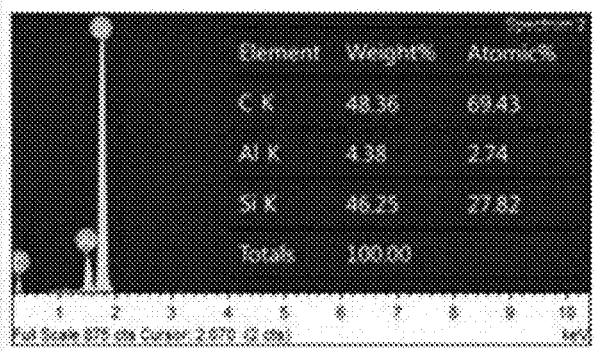

[Fig. 18]
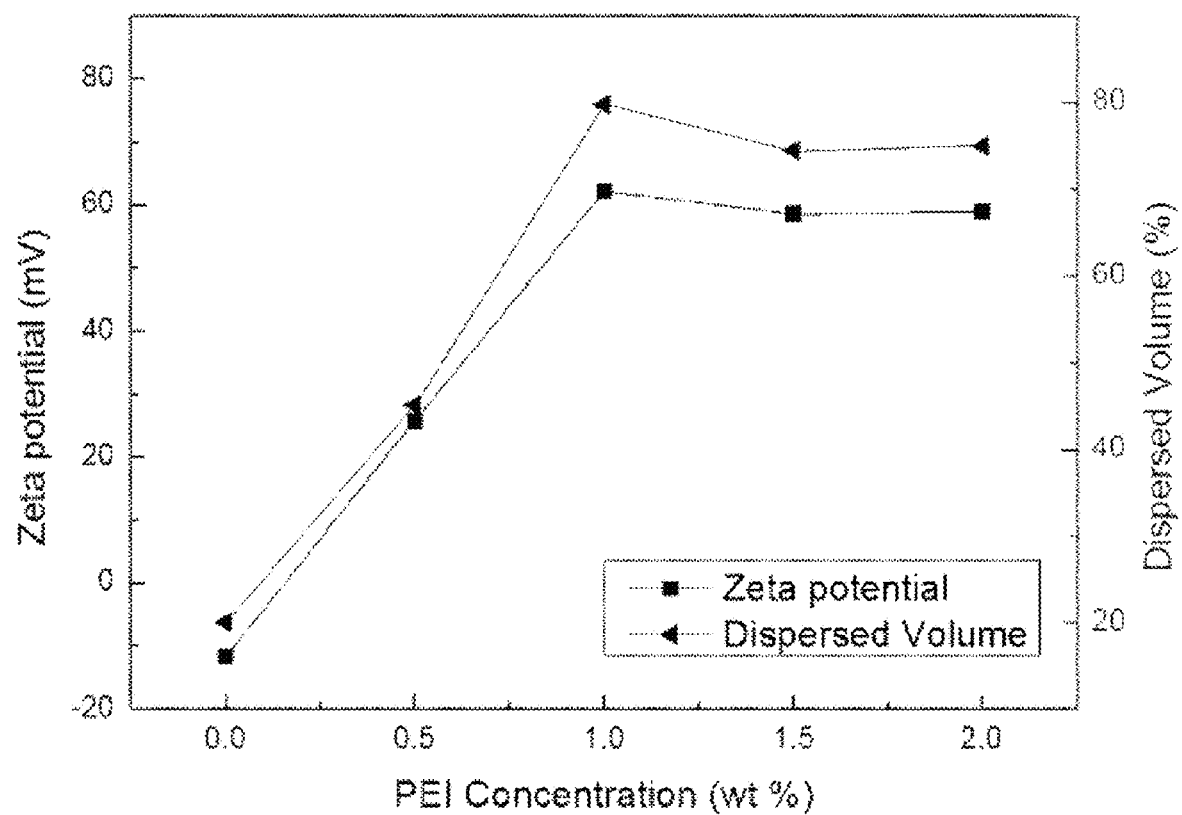

[Fig. 19]
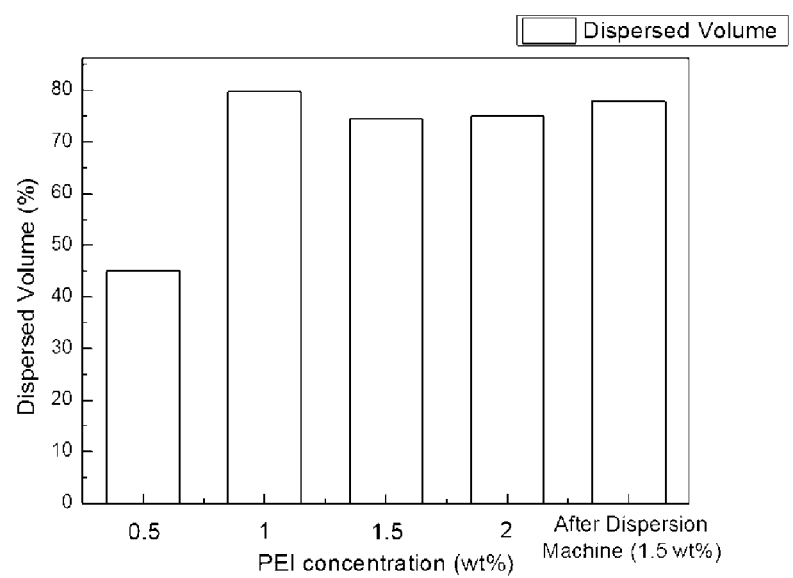

[Fig. 20]
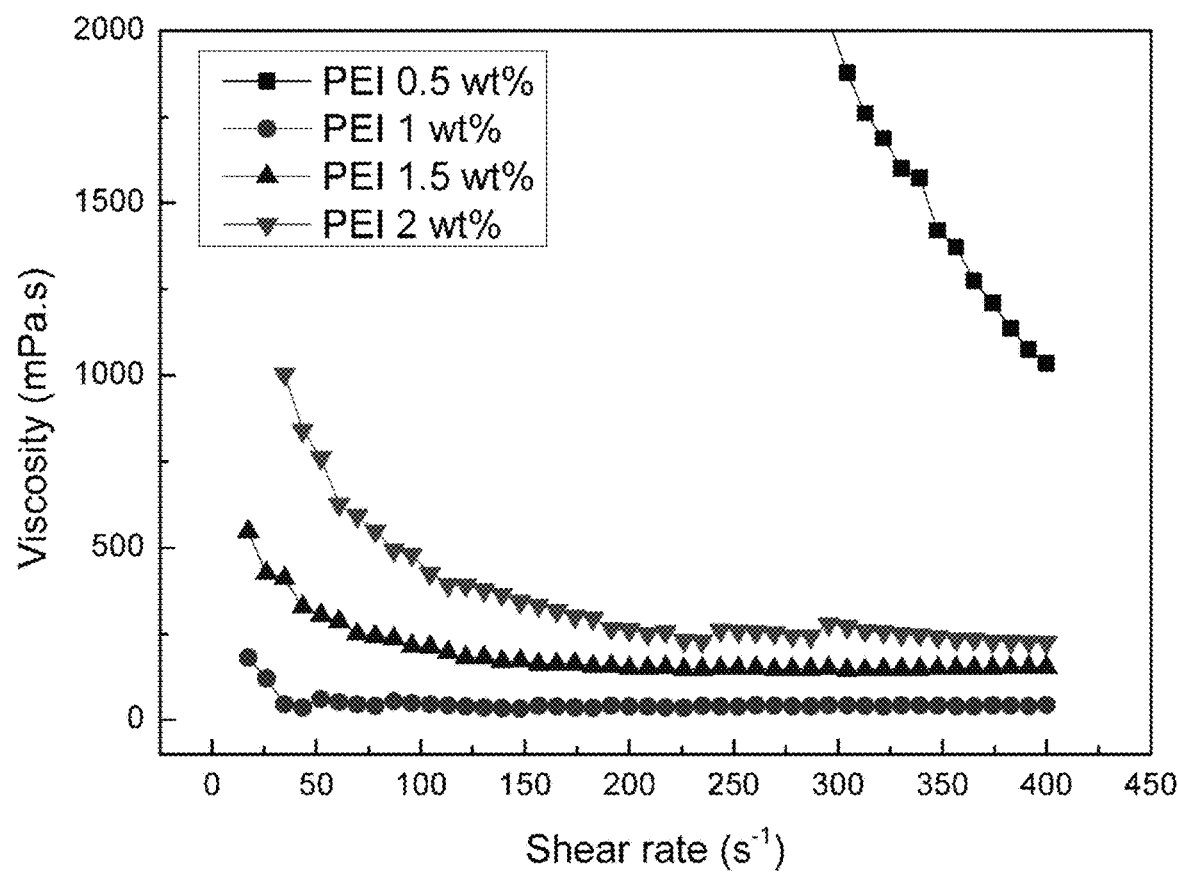

[Fig. 21]
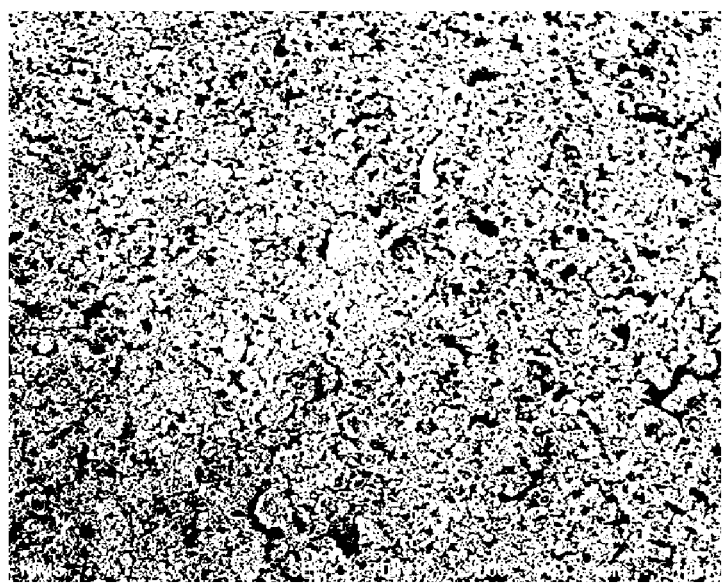

[Fig. 22]
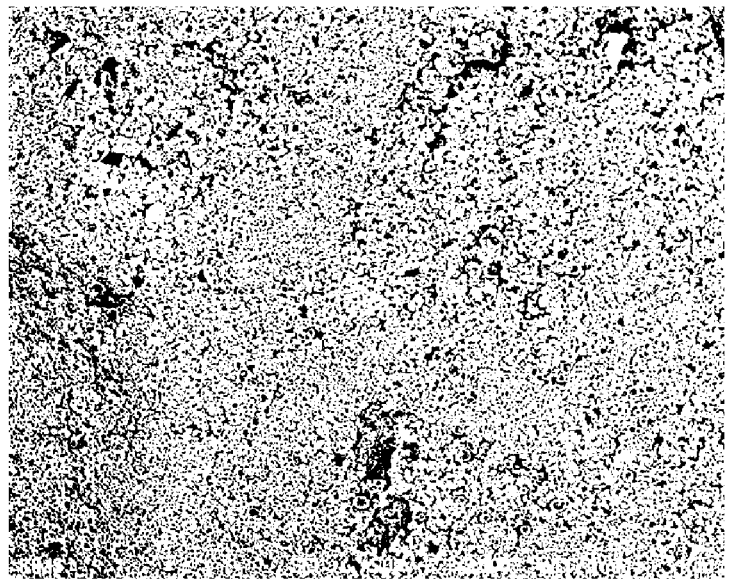
[Fig. 23]
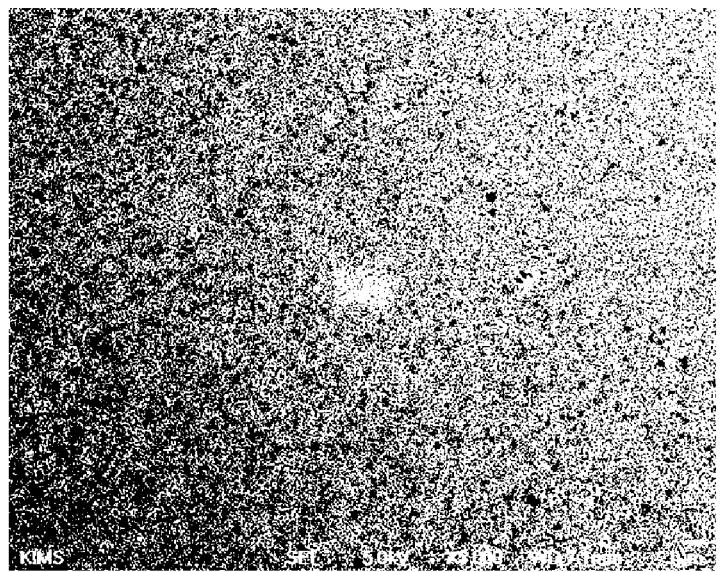

【Fig. 24】
【Fig. 25】
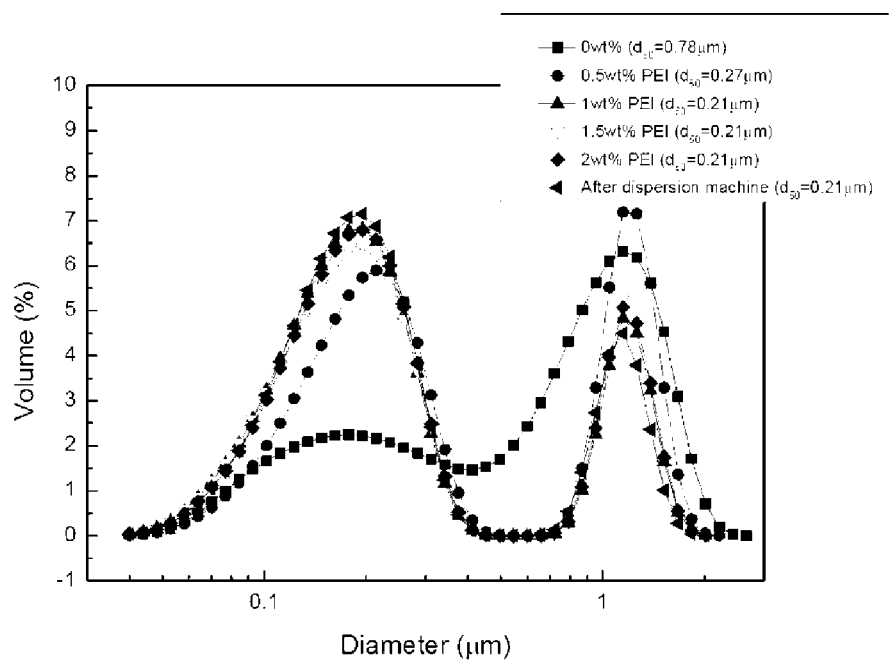

[Fig. 26]
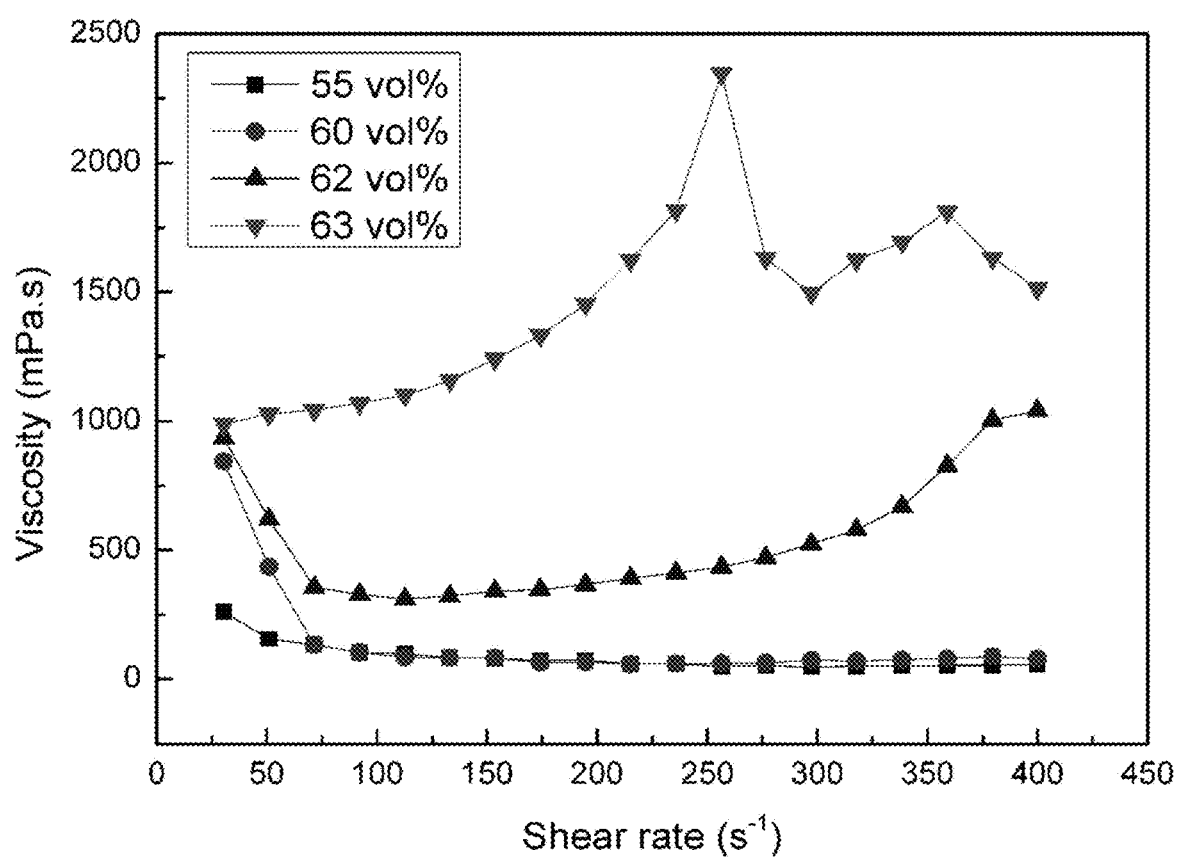

[Fig. 27]
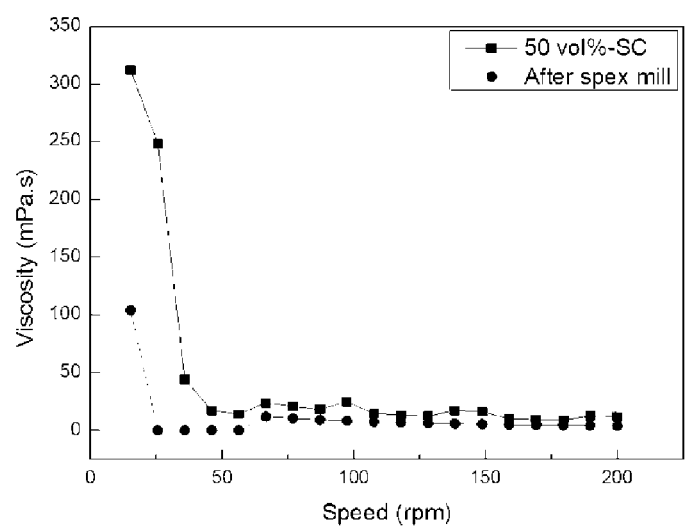

[Fig. 28]
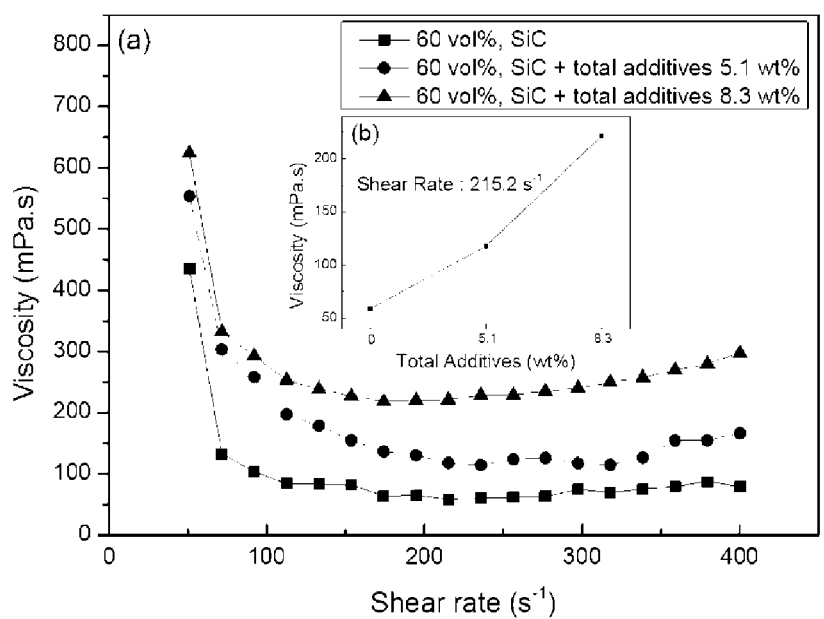
[Fig. 29]
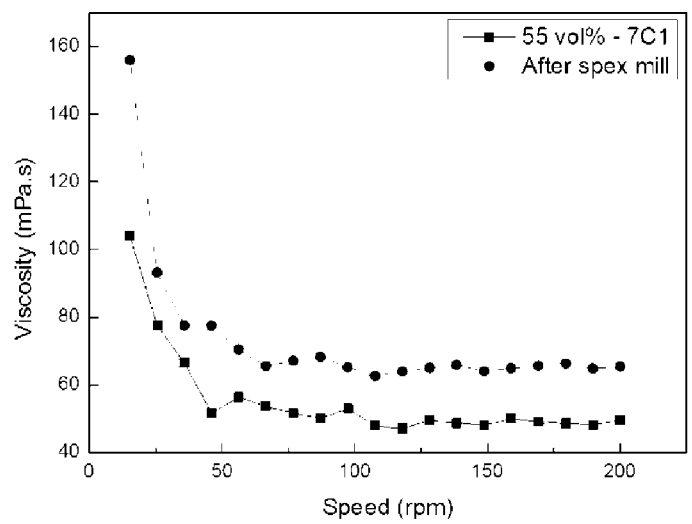

[Fig. 30]
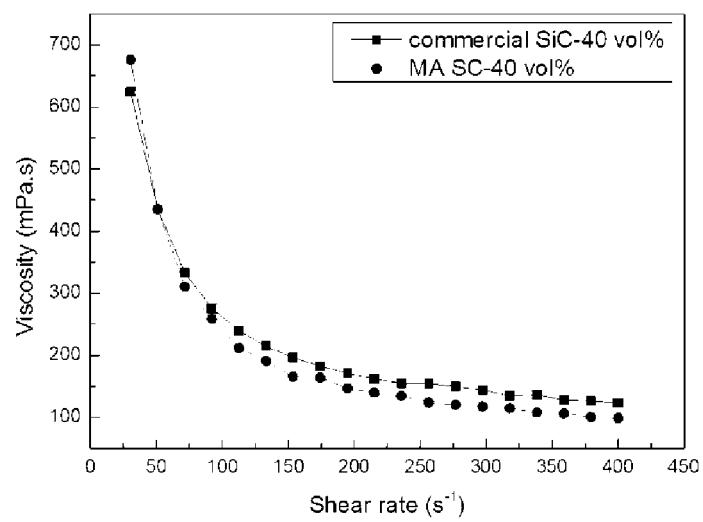

[Fig. 31]
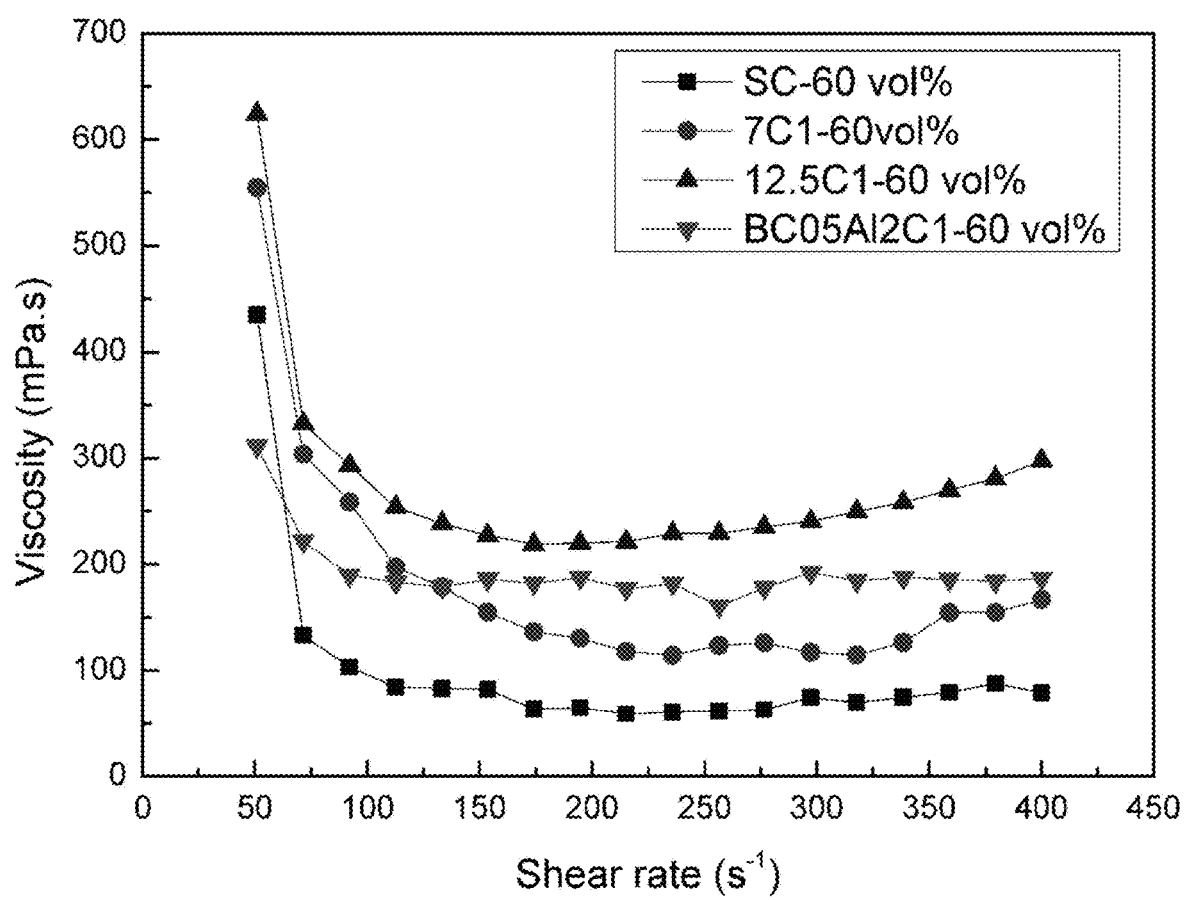

[Fig. 32]
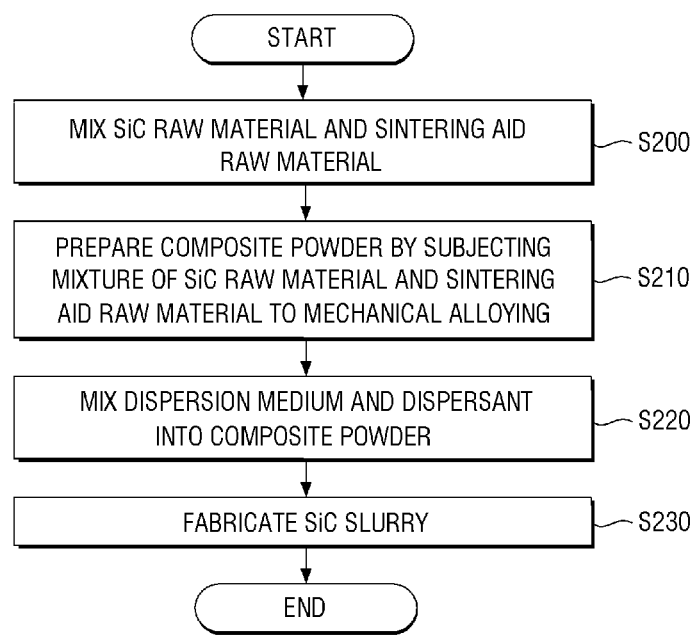

SIC POWDER, SIC SINTERED BODY, SIC SLURRY AND MANUFACTURING METHOD OF THE SAME

This application is a continuation of PCT/KR2015/010931, filed on Oct. 15, 2015 and claims priority from Korean Patent Application No. 10-2015-0107378 filed on Jul. 29, 2015 and Korean Patent Application No. 10-2015-0144254 filed on Oct. 15, 2015 in the Korean Intellectual Property Office, the disclosures of each, are herein incorporated by reference in its entirety.

TECHNICAL FIELD

The invention relates to a silicon carbide (SiC) powder, a SiC sintered body, a SiC slurry, and manufacturing methods of the same, and more particularly, a SiC powder and a SiC sintered body, which can be sintered at low temperature, can be densified, and have high strength and high electrical conductivity, and manufacturing methods of the SiC powder and the SiC sintered body.

The invention also relates to a SiC slurry, which has improved dispersibility and can be prepared to a high concentration, and a manufacturing method of the SiC slurry.

BACKGROUND ART

Silicon carbide (SiC) is a reinforced material having a high tensile rate. Alumina ($Al_2O_3$) is representative of oxide ceramics, and SiC is representative of non-oxide ceramics.

SiC has a wide range of applications due to its excellent mechanical properties such as high wear resistance, excellent thermal properties such as excellent high-temperature strength and high creep resistance, and excellent chemical resistance properties such as high oxidation resistance and high corrosion resistance and has been commonly used in mechanical seals, bearings, a variety of nozzles, high-temperature cutting tools, fireproof panels, abrasives, reducing agents for steel, and lightning arrestors.

However, since the preparation of a SiC sintered body is not simple and easy, the manufacturing cost of a SiC sintered body is very high, and thus, there is a clear limit in making the utmost use of a SiC sintered body. Reducing the manufacturing cost of a SiC sintered body is one of the most important challenges faced to fabricate a SiC sintered body.

To prepare a SiC sintered body, a sintering aid is inevitable. A yttria-alumina-based material, a metal/iron/aluminum mixture, a beryllium compound, a boron compound, or the like may be used as the sintering aid.

However, even if the sintering aid is used, a SiC sintered body having a practical use, e.g., a SiC sintered body having excellent physical properties at a temperature of about 1600° C., can only be fabricated by a long fabrication process performed at a very high temperature of about 2000° C. or higher.

A method of fabricating a SiC sintered body having excellent high-temperature strength through liquid-phase sintering has been disclosed (Kim et al. Acta Mater., 2007). According to this method, a sintered body is fabricated by performing sintering at a temperature of 2000° C. for 6 hours and using $Sc_2O_3$—$Ru_2O_3$—AlN as a sintering aid, and tensile strengths of 644 MPa and 600 MPa are measured from the sintered body at room temperature and a temperature of 1600° C., respectively.

SiC ceramics prepared by liquid-phase sintering performed at low temperature generally undergoes a considerable decrease in strength at a temperature of 1500° C. or lower. For example, in the case of using a $Al_2O_3$—$Y_2O_3$-based sintering aid, sintering is possible at a temperature of 1950° C., but a decrease in bending strength and strong plastic deformation are both observed at a temperature of 1400° C. (A. L. Ortiz et al., J. Europ. Ceram. Soc., 24, 3245-3249 (2004)).

SiC obtained by solid-phase sintering using $B_4C$ and C as a sintering aid maintains excellent strength at a temperature of up to 1500° C., compared to its strength at room temperature, but requires a sintering temperature of as high as 2150° C. for densification (G. Magnani et al., J. Europ. Ceram. Soc., 21, 633-638 (2001)).

That is, a SiC sintered body showing having excellent high-temperature properties, such as a less decrease in strength, at a temperature of up to 1500° C. generally requires very high sintering temperature and long sintering holding time.

Particularly, high sintering temperature means a considerable amount of energy, which leads to an increase in the manufacturing cost of a SiC sintered body. Accordingly, the development of a sintering aid capable of lowering sintering temperature while maintaining the physical properties of SiC is needed, and thus, the development of a SiC sintered body that can be sintered at low temperature and can be highly densified is also needed.

In recent years, research has been vigorously conducted on ways to fabricate a SiC sintered body having high electrical conductivity.

SiC having high electrical conductivity is expected to be used in various fields such as heating elements for high temperature, high-energy elements, and the like.

For example, studies show that specific resistance can be reduced to $1.8 \times 10^{-4} \Omega \cdot cm$ by adding TiN having high electrical conductivity in a second phase, in which case, however, the problem of residual stress may arise due to a difference in a thermal expansion coefficient with the second phase and there also is a disadvantage in that sintering needs to be performed at a high temperature of 2000° C. and a high pressure of 40 MPa for as long as 3 hours.

Thus, it is necessary to develop a SiC powder and a SiC sintered body that not only can be sintered and densified at a relatively low temperature and a relatively low pressure within a short period of time, but also have high electrical conductivity.

In the meantime, SiC has excellent mechanical properties. However, SiC requires the use of a considerable amount of diamond-based abrasives because of its high hardness, and increases in the price of parts, caused by high processing costs, are one of the main factors that inhibit the wide use of a SiC-based material.

To address these problems, various near-net shaping processes such as slip casting, gel casting, and freeze casting that are to be performed after the preparation of a high-concentration SiC slurry have been developed.

In order to manufacture a molded article with high strength, high density, and high uniformity through slurry processing, it is necessary to prepare a slurry having a high concentration and a high viscosity.

It has been reported that a high-concentration slurry of 60 vol % or higher can be obtained from other ceramic powders than SiC.

Studies show that for example, in the case of using $Al_2O_3$, a slurry having a concentration of as high as 62 vol % can be fabricated and in the case of using $SiO_2$, a slurry having a high concentration of as high as 68 vol % can be fabricated.

Studies also show that in the case of using a SiC powder having a relatively coarse grain size of 0.6 μm, a slurry having a concentration of up to 57 vol %, which, however, is relatively low compared to slurries obtained by other ceramic powders, can be prepared.

This is because SiC has the highest Hamaker constant among ceramic materials and is thus affected by the strongest Van der Walls force when dispersed in water.

After comparing the Hamaker constants of various ceramic powders in water, it is noted that the Hamaker constants of $Al_2O_3$, $\beta$-$Si_3N_4$, $SiO_2$, $TiO_2$, and $Y_2O_3$ are 4.72, 6.57, 0.71, 5.65, and 3.85, respectively, but $\beta$-SiC has a Hamaker constant of 11.9, which is much higher than the Hamaker constants of the other ceramic powders (Bergstrom, L., Hamaker constants of inorganic materials, Adv. Colloid Interface Sci., 70, 125-169 (1997)).

Therefore, various studies have been conducted on methods to form $SiO_2$ through the oxidation of the surface of powder or to form a thin coating layer on the surface of powder with $Al_2O_3$ and thus to disperse $Si_3N_4$ or SiC, which is relatively difficult to disperse.

These methods, however, inevitably involve adding impurities to a raw-material powder to improve dispersibility.

Thus, it is necessary to develop a technique for preparing a high-concentration SiC slurry with improved dispersibility.

DISCLOSURE

Technical Problems

To address the aforementioned problems, exemplary embodiments of the invention provide a silicon carbide (SiC) powder and a SiC sintered body, which can be sintered at low temperature, can be highly densified, and have high strength and high electrical conductivity, and manufacturing methods of the SiC powder and the SiC sintered body.

Exemplary embodiments of the invention also provide a high-concentration SiC slurry with improved dispersibility and a manufacturing method of the SiC slurry.

Additional advantages, subjects, and features of the invention will be set forth in part in the description which follows and in part will become apparent to those having ordinary skill in the art upon examination of the following or may be learned from practice of the invention.

Technical Solutions

According to an aspect of the invention, a silicon carbide (SiC) sintered body includes a sintering aid, wherein the sintering aid includes Al and the SiC sintered body contains 0.97 to 4.38 wt % Al in grains thereof.

The SiC sintered body may also contain 0.1 wt % or more of B in the grains thereof.

The SiC sintered body may have a specific resistance of 1 to $10^{-4} \Omega \cdot cm$.

According to another aspect of the invention, a method of manufacturing a SiC sintered body includes: preparing a composite powder by subjecting a SiC raw material and a sintering aid raw material to mechanical alloying; and sintering the composite powder, wherein the sintering aid is at least one selected from the group consisting of an Al—C-based material, an Al—B—C-based material, and a B—C-based material.

The preparing the composite powder may include: mixing the SiC raw material and the sintering aid raw material; and subjecting the mixture of the SiC raw material and the sintering aid raw material to mechanical alloying.

The SiC raw material may include Si and a first carbon source, and the sintering aid raw material may include at least one selected from the group consisting of Al, B, and $B_4C$ and a second carbon source.

The sintering the composite powder may include sintering the composite powder at a temperature of 1550 to 2100° C.

The content of the sintering aid may be 2 to 13 wt %.

According to another aspect of the invention, a method of manufacturing a SiC sintered body includes: preparing a SiC-based composite powder with a sintering aid distributed therein by subjecting Si, at least one selected from the group consisting of Al, B, and $B_4C$, and a carbon source to mechanical alloying; and sintering the composite powder, wherein the sintering aid is at least one selected from the group consisting of an Al—C-based material, an Al—B—C-based material, and a B—C-based material.

The preparing the SiC-based composite powder with the sintering aid distributed therein may include: mixing the Si, the at least one selected from the group consisting of Al, B, and $B_4C$, and the carbon source; and subjecting the mixture of the Si, the at least one selected from the group consisting of Al, B, and $B_4C$, and the carbon source to mechanical alloying.

The SiC-based composite powder may contain at least 0.5 wt % Al and at least 0.1 wt %.

The sintering the composite powder may include sintering the composite powder at a temperature of 1550 to 2100° C.

The SiC sintered body may have a specific resistance of 1 to $10^{-4} \Omega \cdot cm$.

According to another aspect of the invention, a SiC slurry includes a SiC composite powder and a dispersant, wherein the content of the dispersant is 0.5 to 2 wt % relative to 100 wt % of the SiC composite powder.

The dispersant may be polyethyleneimine (PEI) or tetramethyl ammonium hydroxide (TMAH).

The SiC composite powder may include a sintering aid, and the sintering aid may be at least one selected from the group consisting of an Al—C-based material, an Al—B—C-based material, and a B—C-based material.

The content of the sintering aid may exceed 0, but may not be higher than 13 wt %, relative to 100 wt % of the SiC composite powder.

According to another aspect of the invention, a method of manufacturing a SiC slurry includes: preparing a composite powder by subjecting a SiC raw material and a sintering aid raw material to mechanical alloying; and mixing a dispersion medium and a dispersant into the composite powder, wherein the sintering aid is at least one selected from the group consisting of an Al—C-based material, an Al—B—C-based material, and a B—C-based material.

According to another aspect of the invention, a method of manufacturing a SiC slurry includes: preparing a SiC-based composite powder with a sintering aid distributed therein by subjecting Si, at least one selected from the group consisting of Al, B, and $B_4C$, and a carbon source to mechanical alloying; and mixing a dispersion medium and a dispersant into the composite powder, wherein the sintering aid is at least one selected from the group consisting of an Al—C-based material, an Al—B—C-based material, and a B—C-based material.

The mixing the dispersion medium and the dispersant into the composite powder may include mixing the composite powder, the dispersion medium, and the dispersant through agitation and performing ultrasonic dispersion to promote the dispersion of the dispersant.

The method of manufacturing a SiC slurry may also include, after the mixing the dispersion medium and the dispersant into the composite powder, processing the composite powder with a ball mill or a planetary mill.

Advantageous Effects

According to exemplary embodiments of the invention, a silicon carbide (SiC) sintered body that can be sintered at low temperature, can be densified, and has high electrical conductivity can be prepared.

Also, simply by use of as small an amount of sintering aid as 2 to 13 wt %, a densified SiC sintered body can be acquired, and as a result, a SiC sintered body with high strength can be prepared.

Also, a high-concentration SiC slurry with improved dispersibility can be prepared.

Also, a composite powder can be prepared by mixing a SiC raw material and a sintering aid raw material and subjecting the mixture to mechanical alloying. Accordingly, a sintering aid for preparing a high-concentration SiC slurry can be relatively evenly distributed in a SiC powder, and thus, a high-concentration SiC slurry with a high solids content can be prepared with ease.

BRIEF DESCRIPTION OF DRAWINGS

FIG. 1 is a flowchart illustrating a method of preparing a silicon carbide (SiC) sintered body according to an exemplary embodiment of the invention.

FIG. 2, FIG. 3 and FIG. 4 are graphs showing X-ray diffraction (XRD) data of SiC powders synthesized with various compositions under various milling conditions.

FIG. 5 is a transmission electron micrograph (TEM) image of a powder synthesized under a SiCAl3C1 condition, and FIG. 6 is a TEM image of a powder synthesized under a SiCAl7C1 condition.

FIG. 7 is a graph showing the grain size distributions of composite powders.

FIG. 8 is a high resolution-transmission electron micrograph (HR-TEM) of the powder synthesized under the SiCAl7C1 condition.

FIG. 9 is a TEM image of a powder synthesized under a SiCAl5C1 condition.

FIG. 10 is a TEM image of a SiC powder sintered under the SiCAl7C1 condition, and FIG. 11 shows EDS mapping results obtained from the Al element in the SiC powder sintered under the SiCAl7C1 condition.

FIG. 12 is an image showing the microstructure of a SiC powder sintered under 1800° C./20 MPa sintering conditions using an Al3C1 composition, and FIG. 13 is an image showing the microstructure of a SiC powder sintered under 1650° C./20 MPa sintering conditions using an Al12.5C1 composition.

FIG. 14, FIG. 15, FIG. 16 and FIG. 17 show SEM and EDS analysis results obtained from specimens sintered at various temperatures while increasing the content of a sintering aid.

FIG. 18 is a graph showing the variation of zeta potential with PEI content,

FIG. 19 is a graph showing the sedimentation behavior of slurries with different PEI contents, and FIG. 20 is a graph showing the variation, with PEI content, of the viscosity of a SiC slurry having a solids content of 55 vol %.

FIG. 21, FIG. 22, FIG. 23 and FIG. 24 are photographs showing the microstructure of 10 wt % SiC slurries with different PEI contents. More specifically, FIG. 21 corresponds to a PEI content of 0 wt %, FIG. 22 corresponds to a PEI content of 0.5 wt %, FIG. 23 corresponds to a PEI content of 1 wt %, and FIG. 24 corresponds to a PEI content of 2 wt %.

FIG. 25 is a graph showing the variation of a grain size distribution with PEI content.

FIG. 26 is a graph showing the variation of the viscosity of a slurry with solids content.

FIG. 27 is a graph showing the variation of the viscosity of a 60 vol % slurry agitated and dispersed with ultrasonic waves and the variation of the viscosity of the slurry after redispersion through high-energy milling.

(a) region of FIG. 28 shows the viscosity behavior of 60 vol % slurries prepared from SiC powders, each containing Al and C as a sintering aid, and (b) region of FIG. 28 shows the variation of the viscosity of a slurry with the content of a sintering aid at a fixed shear rate of 215.2 s$^{-1}$.

FIG. 29 is a graph showing the variation of the viscosity of a 60 vol % slurry obtained by agitating a SiC powder, containing Al and C in the amount of 5.1 wt % as a sintering aid, and dispersing the SIC powder with ultrasonic waves and the variation of the viscosity of the slurry after redispersion through high-energy milling.

FIG. 30 is a graph comparing the viscosity of a commercial SiC powder and the viscosity of a 40 vol % slurry obtained from a powder synthesized by mechanical alloying in accordance with the invention.

FIG. 31 is a graph comparing the viscosities of 60 vol % slurries with various corrmpositions.

FIG. 32 is a flowchart illustrating a method of preparing a SiC slurry according to an exemplary embodiment of the invention.

BEST MODES FOR CARRYING OUT THE INVENTION

Advantages and features of the invention and methods of accomplishing the same may be understood more readily by reference to the following detailed description of exemplary embodiments and the accompanying drawings. The invention may, however, be embodied in many different provides and should not be construed as being limited to the embodiments set forth herein. Rather, these embodiments are provided so that this disclosure will be thorough and complete and will fully convey the concept of the invention to those skilled in the art, and the invention will only be defined by the appended claims.

Like reference numerals refer to like elements throughout the specification. Furthermore, in the present disclosure, the expression "and/or" includes any and all combinations of the associated listed words.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the specification and will not be interpreted in an idealized or overly formal sense unless expressly so defined herein.

Exemplary embodiments of the invention will hereinafter be described with reference to the accompanying drawings.

FIG. 1 is a flowchart illustrating a method of preparing a silicon carbide (SiC) sintered body according to an exemplary embodiment of the invention.

Referring to FIG. 1, the method of preparing a SiC sintered body includes mixing a SiC raw material and a sintering aid raw material (S100).

The SiC raw material may be understood as being a starting material for producing SiC, and the sintering aid raw material may be understood as being a starting material for producing a sintering aid.

The SiC raw material may comprise Si and a first carbon source, and the sintering aid raw material may comprise at least one selected from the group consisting of Al, B, and $B_4C$ and a second carbon source.

Each of the first and second carbon source may be, but is not particularly limited to, solid-phase carbon such as graphite, black lead, carbon black, or activated carbon.

The method of preparing a SiC sintered body further includes preparing a composite powder by subjecting the SiC raw material and the sintering aid raw material to a mechanical alloying process (S110).

That is, the SiC raw material and the sintering aid raw material may be mixed together, and the mixture of the SiC raw material and the sintering aid raw material may be subjected to the mechanical alloying process, thereby producing a composite powder.

According to the invention, a SiC-based composite powder with a sintering aid evenly distributed therein can be prepared through the mechanical alloying process.

For convenience, S100 and S110 are illustrated as being performed one after another, but alternatively, S100 and S110 may be performed at the same time.

That is, the mixing of the SiC raw material and the sintering aid raw material, i.e., S100, and the preparation of a composite powder through the mechanical alloying process, i.e., S110, may be performed at the same time. Accordingly, S100 and S110 may be understood as being steps of preparing a SiC-based composite powder with a sintering aid evenly distributed therein by subjecting the SiC raw material and the sintering aid raw material to the mechanical alloying process.

The mechanical alloying process may be performed, but is not particularly limited to, using a planetary mill, a Spex mill, and a high-energy ball mill that operates according to similar principles to a Spex mill.

A milling ball and a milling jar used in the mechanical alloying process may preferably be a SiC ball and a SiC jar, respectively.

That is, by using a SiC ball and a SiC jar, the infiltration of impurities from a milling ball and a milling jar during milling can be prevented.

However, the materials of the milling ball and the milling jar are not particularly limited. For example, in a case in which a WC ball is used, WC may be mixed into a SiC-based composite powder after milling, and it is confirmed that even a SiC-based composite powder with WC mixed thereinto shows similar low-temperature sintering behavior to that of a composite powder obtained using a SiC jar and a SiC ball and has as high electrical conductivity as the composite powder obtained using a SiC jar and a SiC ball.

The step of preparing the composite powder may be represented by the following chemical equation:

$$Si+C \rightarrow SiC \qquad \text{(Equation 1)}$$

In accordance with Equation 1, SiC according to the invention can be synthesized, and due to high milling energy, the sintering aid added can be relatively evenly mixed in the synthesized SiC.

That is, as a result of the step of preparing the composite powder, SiC can be synthesized, a sintering aid such as, for example, Al—C, can be relatively evenly mixed into the synthesized SiC, and then, a SiC sintered body with high electrical conductivity can be prepared by sintering the SiC powder with the sintering aid mixed thereinto.

As mentioned above, the sintering aid raw material may comprise at least one selected from the group consisting of Al, B, and $B_4C$ and the second carbon source. Thus, the sintering aid may comprise at least one selected from the group consisting of an Al—C-based material, an Al—B—C-based material, and a B—C-based material. For example, the sintering aid may be Al—C, Al—B—C, Al—$B_4C$—C, B—C and/or $B_4C$—C.

The sintering aid may be relatively evenly distributed in the synthesized SiC powder. The content of the sintering aid in the composite powder may be 1.5 to 15 wt %.

That is, according to the invention, a composite powder can be prepared by mixing a SiC raw material and a sintering aid raw material and subjecting the mixture to mechanical alloying. Accordingly, SiC and a sintering aid for synthesizing a SiC sintered body can be prepared. Since the sintering aid can be relatively evenly distributed into a SiC powder, SiC can be densified by use of an even smaller amount of sintering aid, or at a much lower temperature or pressure, than in the prior art.

Therefore, as mentioned above, the content of the sintering aid in the composite powder ranges from 1.5 to 15 wt %, and by using a small amount of sintering aid, a densely-sintered SiC sintered body can be prepared.

S100 and S110 may be represented as follows.

For convenience, the first carbon source and the third carbon source have been described, in connection with S100, as being separate carbon sources, but may be understood as being a single carbon source when they are mixed.

Thus, S100 may be represented as a step of mixing Si, at least one selected from the group consisting of, Al, B, and $B_4C$, and a carbon source, and the carbon source may be solid-phase carbon such as graphite, carbon black, or activated carbon.

In this case, S110 may be represented as a step of producing a composite powder through the mechanical alloying of the mixture of Si, at least one selected from the group consisting of, Al, B, and $B_4C$, and a carbon source.

Also, as mentioned above, S100 and S110 may be performed at the same time, in which case, S100 and S110 may be represented as steps of producing a composite powder through the mechanical alloying of the mixture of Si, at least one selected from the group consisting of Al, B, and $B_4C$, and a carbon source.

Referring further to FIG. 1, the method of preparing a SiC sintered body further includes sintering the composite powder (S120).

Sintering is a process of densifying, at high temperature, a molded article obtained from a powder, and densification and grain growth are the main phenomena of sintering.

Sintering may be classified into normal sintering, pressure sintering, or spark plasma sintering depending on how to densify a sintered body.

Normal sintering is a method of densifying a sintered body by thermally treating the sintered body in the air at atmospheric pressure, or in an inert atmosphere at high temperature, through a typical sintering process, pressure sintering is a method of densifying a sintered body by applying pressure to the sintered body from outside the sintered body, and spark plasma sintering is a method of densifying a sintered body at low temperature by flowing a high-current pulse to the sintered body while applying pressure to the sintered body.

The step of sintering the composite powder may be performed, but is not particularly limited to, using normal sintering, pressure sintering, or spark plasma sintering.

In the step of sintering the composite powder, the composite powder may be sintered at a temperature of 1550 to 2100° C. in a vacuum, argon (Ar), or nitrogen atmosphere for 5 to 120 minutes by using the spark plasma sintering method.

As a result, the SiC sintered body according to the invention can be prepared (S130).

FIG. 32 is a flowchart illustrating a method of preparing a SiC slurry according to an exemplary embodiment of the invention. The method of preparing a SiC slurry will hereinafter be described, in part, by referencing the above description of the method of FIG. 1.

Referring to FIG. 32, the method of preparing a SiC slurry includes mixing a SiC raw material and a sintering aid raw material (S200).

The SiC raw material may be understood as being a starting material for producing SiC, and the sintering aid raw material may be understood as being a starting material for producing a sintering aid.

The SiC raw material may comprise Si and a first carbon source, and the sintering aid raw material may comprise at least one selected from the group consisting of Al, B, and $B_4C$ and a second carbon source.

Each of the first and second carbon sources may be, but is not particularly limited to, solid-phase carbon such as graphite, black lead, carbon black, or activated carbon.

The method of preparing a SiC sintered body further includes preparing a composite powder by subjecting the SiC raw material and the sintering aid raw material to a mechanical alloying process (S210).

That is, the SiC raw material and the sintering aid raw material may be mixed together, and the mixture of the SiC raw material and the sintering aid raw material may be subjected to the mechanical alloying process, thereby producing a composite powder.

According to the invention, a SiC-based composite powder with a sintering aid evenly distributed therein can be prepared through the mechanical alloying process.

For convenience, S200 and S210 are illustrated as being performed one after another, but alternatively, S200 and S210 may be performed at the same time.

That is, the mixing of the SiC raw material and the sintering aid raw material, i.e., S200, and the preparation of a composite powder through the mechanical alloying process, i.e., S210, may be performed at the same time.

Accordingly, S200 and S210 may be understood as being steps of preparing a SiC-based composite powder with a sintering aid evenly distributed therein by subjecting the SiC raw material and the sintering aid raw material to the mechanical alloying process.

S200 and S210 are illustrated as being steps of preparing a SiC-based composite powder through the mechanical alloying of the mixture of the SiC raw material and the sintering aid raw material, but alternatively, the sintering aid raw material may not be used. Accordingly, S200 and S210 may be represented as steps of preparing a SiC-based composite powder through the mechanical alloying of the SiC raw material.

The mechanical alloying process may be performed, but is not particularly limited to, using a planetary mill, a Spex mill, and a high-energy ball mill that operates according to similar principles to a Spex mill.

That is, as a result of the step of preparing the composite powder, SiC can be synthesized, a sintering aid such as, for example, Al—C, can be relatively evenly mixed into the synthesized SiC, and then, a SiC slurry with a high solids content can be prepared by sintering the SiC powder with the sintering aid mixed thereinto.

As mentioned above, the sintering aid raw material may comprise at least one selected from the group consisting of Al, B, and $B_4C$ and the second carbon source. Thus, the sintering aid may comprise at least one selected from the group consisting of an Al—C-based material, an Al—B—C-based material, and a B—C-based material. For example, the sintering aid may be Al—C, Al—B—C, Al—$B_4C$—C, B—C and/or $B_4C$—C.

The sintering aid may be Al—C, Al—B—C, Al—$B_4C$—C, B—C and/or $B_4C$—C relatively evenly distributed in the synthesized SiC powder, and the content of the sintering aid in the composite powder may exceed 0, but may not be higher than 13 wt %.

As mentioned above, the sintering aid raw material may not be used. Thus, the SiC composite powder may not contain a sintering aid.

That is, according to the invention, a composite powder can be prepared by mixing a SiC raw material and a sintering aid raw material and subjecting the mixture to mechanical alloying. Accordingly, a sintering aid for preparing a high-concentration SiC slurry can be relatively evenly distributed in a SiC powder, and thus, a high-concentration SiC slurry with a high solids content can be prepared with ease.

S200 and S210 may be represented as follows.

For convenience, the first carbon source and the third carbon source have been described, in connection with S200, as being separate carbon sources, but may be understood as being a single carbon source when they are mixed.

Thus, S200 may be represented as a step of mixing Si, at least one selected from the group consisting of Al, B, and $B_4C$, and a carbon source, and the carbon source may be solid-phase carbon such as graphite, carbon black, or activated carbon.

In this case, S210 may be represented as a step of producing a composite powder through the mechanical alloying of the mixture of Si, at least one selected from the group consisting of Al, B, and $B_4C$, and a carbon source.

Also, as mentioned above, S200 and S210 may be performed at the same time, in which case, S200 and S210 may be represented as steps of producing a composite powder through the mechanical alloying of the mixture of Si, at least one selected from the group consisting of Al, B, and $B_4C$, and a carbon source.

Referring further to FIG. 32, the method of preparing a SiC slurry further includes mixing a dispersion medium and a dispersant with the composite power (S220).

Water or alcohol may be used as the dispersion medium, and polyethyleneimine (PEI) or tetramethyl ammonium hydroxide (TMAH) may be used as the dispersant.

The amount of the dispersant may preferably be 0.5 to 2 wt % relative to 100 wt % of the composite powder.

The dispersion medium and the dispersant may be mixed with the composite powder by dissolving a predetermined amount of the dispersant in the dispersion medium and vigorously agitating the dispersion medium along with the composite powder.

Although not illustrated in the drawings, an ultrasonic dispersion machine may also be used to promote the dispersion of the dispersant, and the resulting slurry may be subjected to ball milling or planetary milling so as to further promote the dispersion of the dispersant.

In this manner, a SiC slurry may be prepared (S230).

A preferred experimental example will hereinafter be described, but the invention is not limited to this preferred experimental example.

EXPERIMENTAL EXAMPLE

In the experimental example of the invention, Al, Si, $B_4C$, and carbon black were used as raw materials. That is, as mentioned above, according to the invention, a SiC raw material may comprise Si and a first carbon source, and a sintering aid raw material may compromise at least one material selected from the group consisting of Al, B, and $B_4C$ and a second carbon source. Accordingly, some carbon black may be used as the first carbon source, and some carbon black may be used as the second carbon source.

The compositions and abbreviated names of the raw materials used in the experiment are as shown in Table 1 below.

TABLE 1

| Abbreviated Name | Raw Material Composition (wt %) | Al Content (wt %) | Excess C Content (wt %) | $B_4C$ Content (wt %) |
|---|---|---|---|---|
| Al0.86C1 | 68.87 Si + 30.62 C + 0.5 Al | 0.5 | 1 | 0 |
| Al1C1 | 68.80 Si + 30.62 C + 0.59 Al | 0.59 | 1 | 0 |
| Al2C1 | 68.25 Si + 30.58 C + 1.17 Al | 1.17 | 1 | 0 |
| Al3 | 68.40 Si + 29.84 C + 1.76 Al | 1.76 | 0 | 0 |
| Al3C0.5 | 68.05 Si + 30.19 C + 1.76 Al | 1.76 | 0.5 | 0 |
| Al3C1 | 67.70 Si + 30.54 C + 1.76 Al | 1.76 | 1 | 0 |
| Al4C1 | 67.15 Si + 30.50 C + 2.35 Al | 2.35 | 1 | 0 |
| Al5C1 | 66.61 Si + 30.46 C + 2.93 Al | 2.93 | 1 | 0 |
| Al5C2 | 65.91 Si + 31.16 C + 2.93 Al | 2.93 | 2 | 0 |
| Al7 | 66.21 Si + 29.69 C + 4.10 Al | 4.10 | 0 | 0 |
| Al7C0.5 | 65.86 Si + 30.04 C + 4.10 Al | 4.10 | 0.5 | 0 |
| Al7C1 | 65.51 Si + 30.39 C + 4.10 Al | 4.10 | 1 | 0 |
| Al10C1 | 63.87 Si + 30.27 C + 5.86 Al | 5.86 | 1 | 0 |
| Al12.5C1 | 62.50 Si + 30.17 C + 7.33 Al | 7.33 | 1 | 0 |
| Al15C1 | 61.13 Si + 30.08 C + 8.80 Al | 8.80 | 1 | 0 |
| Al20C1 | 58.39 Si + 29.88 C + 11.73 Al | 11.73 | 1 | 0 |
| B05Al1C1 | 68.29 Si + 30.21 C + 1 Al + 0.5 $B_4C$ | 1 | 1 | 0.5 |
| B05Al2C1 | 67.59 Si + 29.91 C + 2 Al + 0.5 $B_4C$ | 2 | 1 | 0.5 |
| B1C1 | 68.64 Si + 30.36 C + 1 $B_4C$ | 0 | 1 | 1 |

Referring to Table 1, "Al3" indicates controlling the Al:Si:C molar ratio of a sintering aid to be the same as the Al:Si:C molar ratio of the compound $Al_4SiC_4$, i.e., 4:1:4, and controlling the amount of the sintering aid to be 3 wt % while fixing the Si:C ratio of the sintering aid at 1:1 for the synthesis of SiC; "Al5" in "Al5C1" indicates controlling the Al:Si:C molar ratio of the sintering aid to be 4:1:4 and controlling the amount of the sintering aid to be 5 wt % while fixing the Si:C ratio of the sintering aid at 1:1 for the synthesis of SiC; "Al7C1" and "Al12.5C1" indicate controlling the Al:Si:C molar ratio of the sintering aid to be the same as the Al:Si:C molar ratio of $Al_4SiC_4$, i.e., 4:1:4, and controlling the amount of the sintering aid to be 7 and 12.5 wt %, respectively, while fixing the Si:C ratio of the sintering aid at 1:1 for the synthesis of SiC; "C1" indicates additionally adding 1 wt % excess carbon; and "B1 C1" indicates adding 1 wt % $B_4C$ and 1 wt % C as a sintering aid while fixing the Si:C ratio of the sintering aid at 1:1 for the synthesis of SiC.

Thus, in the case of the Al2C1 composition, the actual content of the sintering aid was 2.17 wt %, and in the case of the Al20C1 composition, the actual content of the sintering aid was 12.73 wt %.

Table 1 shows the amounts of all the ingredients of the sintering aid except for SiC, i.e., the amounts of Al, C, and $B_4C$, separately.

Thereafter, composite powders were prepared through the mechanical alloying of the aforementioned raw material compositions. More specifically, to minimize contamination, each of the aforementioned raw material compositions was mixed at 360 rpm or 400 rpm for 72 hours by use of a planetary mill using a SiC jar and a SiC ball. The ratio of a milling ball to each raw material composition powder was 1:6.67, and to prevent the oxidation of each powder, the milling jar of the planetary mill was sealed in a glove box in an Ar atmosphere. Each powder was sieved with a 150-mesh sieve inside the glove box in an Ar atmosphere.

The characteristics of each composite powder prepared by mechanical alloying will hereinafter be described.

The degree of contamination from the milling ball and the milling jar during milling was measured and calculated based on any variation in the mass of the milling ball before and after the experiment, and the results are as shown in Table 2 below.

TABLE 2

| | | Ball Contamination | |
|---|---|---|---|
| Abbreviation | rpm | SiC (%) | Al (%) |
| SiCAl3C1 | 360 | 1.93 | 0.19 |
| | 400 | 6.7 | 0.67 |
| SiCAl7C1 | 360 | 2.6 | 0.26 |
| | 400 | 6.3 | 0.63 |

Referring to Table 2, EDS analysis results show that a commercial SiC ball contained Al in the amount of about 10 wt %. The amount of contamination of Al added during milling was as relatively low as about 0.2 to 0.3 wt % when the speed of the planetary mill was 360 rpm, but was increased to about 0.6 to 0.7 wt % when the speed of the planetary mill was 400 rpm. On the other hand, the contamination of Al by the milling jar hardly occurred because the milling jar was reaction-bonded SiC (RBSC).

To analyze the phase of each composite powder, each powder was measured with an X-ray diffraction analyzer under a Cu-Kα condition, and the microstructure and the chemical composition of each powder were observed using a high magnification transmission electron microscopy (TEM) with an EDS attached thereto.

The grain size distribution of each composite powder was measured using a grain size analyzer, and the average size of crystal grains present in each powder was measured using an image analyzer (or nano measurer).

FIG. 2, FIG. 3 and FIG. 4 are graphs showing XRD data obtained from SiC powders synthesized with various compositions under various milling conditions, Referring to FIG. 2, FIG. 3 and FIG. 4, "Al3C1_360 rpm", for example, indicates controlling the amount of an Al—Si—C sintering aid having the composition $Al_4SiC_4$ to be 3 wt %, controlling the amount of a carbon sintering aid to be 1 wt %, and controlling the speed of milling to be 360 rpm, and "Al3C1_400 rpm", for example, indicates controlling the amount of the Al—Si—C sintering aid having the composition $Al_4SiC_4$ to be 5 wt %, controlling the amount of the carbon sintering aid to be 1 wt %, and controlling the speed of milling to be 400 rpm.

As shown in FIG. 2, FIG. 3 and FIG. 4, no particular differences were observed from the XRD data regardless of whether the content of the sintering aid was changed from 3 to 7 wt %, the content of the third carbon source was increased to 0.5 or 1 wt %, or the speed of milling was changed from 360 to 400 rpm, and it is confirmed that all the powders consisted of β-SiC (3C—SiC) only without any residual Si, Al, and C ingredients.

According to the mechanism in which Si and C are synthesized into SiC through mechanical alloying, the C atom, instead of Si, exists in the form of an amorphous Si comprising C and forms SiC as the grains become fine and defect sites that are chemically active increase over the course of milling.

According to XRD analysis results, no Al, $B_4C$, and carbon peaks were observed, and this is believed to be because these ingredients were evenly distributed in SiC due to the high-energy milling.

Also, since a SiC ball and a SiC jar were used, no particular second phase that may have been caused by contamination was observed. SiC peaks appeared in a broad shape because the crystallite size was considerably reduced by high-energy milling. The crystallite sizes of the powder synthesized at 360 rpm and the powder synthesized at 400 rpm, as calculated using the Sherrer equation, were 17.6 and 12.7 nm, respectively.

No particular changes in powder characteristics in accordance with increases in the amount of the sintering aid were not observed until the "Al12.5C1" composition, but in the case of the Al15C1 composition, powder coagulation was observed. Particularly, in the case of the Al20C1 composition, the powder severely coagulated after milling, causing difficulty for subsequent steps. The results of the sintering of the powders obtained in the experiment show that the higher the content of the sintering aid, the higher the sintering density at a temperature of 1550° C. Thus, the amount of an Al—Si—C-based sintering aid may preferably be set to 20 wt % or less. That is, the total amount of sintering aid may preferably be set to 13 wt % or less.

FIG. 5 is a TEM image of a powder synthesized under a SiCAl3C1 condition, and FIG. 6 is a TEM image of a powder synthesized under a SiCAl7C1 condition.

Referring to FIGS. 5 and 6, the grains were spherical and consisted of primary SiC particles of 10 to 20 nm and particles of about 100 nm, resulting from the coagulation of amorphous-state Si—C phases. This coagulation is believed to have been caused by cold welding during high-energy ball milling. Also, dark points inside the powder, as shown in FIGS. 5 and 6, indicate that SiC was partially crystallized. No particular differences in grain size were observed when the Al content was changed from that of the Al3C1 composition to that of the Al7C1 composition.

FIG. 7 is a graph showing the grain size distributions of powders.

FIG. 7 shows bimodal distributions each having a primary peak in the range of 100 to 200 nm and a secondary peak in the range of 1 μm. SEM and TEM observation results show that the peak in the range of 1 μm was formed by the coagulation of smaller particles and most of the particles were of 300 nm or less.

FIG. 8 is a high resolution-transmission electron micrograph (HR-TEM) of the powder synthesized under the SiCAl7C1 condition.

Referring to FIG. 8, crystallized SiC particles were observed from inside the amorphous Si—C matrix. Even very small particles of about 2 nm were observed. It is found that the surface of particles of about 100 nm existed in an amorphous state. The amorphous phase of the surface resulted in high sintering driving force and high dispersion speed and increased reaction interfaces, leading to the promotion of the sintering of SiC at low temperature.

FIG. 9 is a TEM image of a powder synthesized under a SiCAl5C1 condition, and the contents of the elements of the powder at each point of FIG. 9 are as shown in Table 3.

TABLE 3

| Point | Content (wt %) | | | |
|---|---|---|---|---|
| | C | O | Al | Si |
| 003 | 37.3 | 1.57 | 1.94 | 59.2 |
| 004 | 40.24 | 2.48 | 1.83 | 55.44 |
| 005 | 29.91 | 2.28 | 1.69 | 66.12 |
| 006 | 42.88 | 3.93 | 2.17 | 51.01 |

Referring to FIG. 9 and Table 3, the Al contents of various powders synthesized under the Al5C1 condition do not much differ from one another. It is well known that when a sintering aid is evenly distributed in a powder, the sintering characteristics of the powder can be improved. Also, it is reported that in the case of preparing oxide powders using a sol-gel method or a co-precipitation method, an oxide powder having a sintering aid uniformly distributed therein can be densified at a lower temperature than an oxide powder obtained by synthesizing a powder and a sintering aid separately and then mixing them together later.

The solid solubility limits of Al and B in SiC are known to be 0.5 wt % and 0.1 wt %, respectively, but as shown in FIG. 9 and Table 1, a SiC powder synthesized by he aforementioned method of the invention can contain more Al and B than the solid solubility limits of 0.5 wt % and 0.1 wt %, respectively, and this is one of the main features of the invention.

According to the invention, due to high Al and B contents in a SiC powder, excellent sintering characteristics can be provided at low temperature by adding only a small amount of sintering aid, and high electrical conductivity can also be provided.

As mentioned above, according to the invention, the sintering aid may be Al—C, Al—B—C, Al—$B_4C$—C, B—C and/or $B_4C$—C relatively evenly distributed in a SiC powder, wherein the content of the sintering aid in the powder exceeds 0, but is not higher than 13 wt %.

As also mentioned above, according to the invention, no sintering aid raw material may be used, in which case, the SiC composite powder may not comprise any sintering aid.

In short, according to the invention, a composite powder can be prepared by mixing a SiC raw material and a sintering aid raw material and subjecting the mixture to mechanical alloying. Accordingly, a sintering aid for preparing a high-concentration SiC slurry can be relatively evenly distributed in a SiC powder, and thus, a high-concentration SiC slurry with a high solids content can be prepared with ease.

was conducted using a 4-point bending strength testing machine and six specimens.

Table 4 below shows the relative densities of specimens densified with various compositions under various sintering conditions.

Referring to Table 4, it is noted that specimens with no particular pressure/time information are specimens sintered under a pressure of 20 MPa for a 30-minute holding time and specimens sintered under other pressure/holding time conditions are presented with their respective pressure/holding time information.

TABLE 4

| Composition | Sintering Temperature (° C.) | | | | | | | | | | |
|---|---|---|---|---|---|---|---|---|---|---|---|
| | 1550 | 1600 | 1650 | 1700 | 1750 | 1800 | 1850 | 1900 | 1950 | 2000 | 2100 |
| Al0.86C1 | | | | | | | | 78.4 | 79.3 | 89.1 | |
| Al1C1 | | | | | | | 79.6 | 83.4 | 82.6 | 86.6 | 93.5 |
| Al1C1 (2 h) | | | | | | | | | | | 91.9 |
| Al1C1 (40 MPa) | | | | | | | | | | | 92.8 |
| A2C1 | | | | | | | 93.4 | 97.0 | 97.8 | | |
| Al3 | | | | | | | 94.5 | | | | |
| Al3C0.5 | | | | | | 97.8 | 94.5 | | | | |
| Al3C1 | | | | | 94.2 | 97.6 | 96.5 | | 94.0 | | |
| Al4C1 | | | | | | | | | 95.0 | | |
| Al5C1 | | | | | 95.4 | 96.8 | 94.6 | | | | |
| Al5C1 (400 rpm) | | | | | 92.6 | 96.6 | 93.8 | | 93.7 | | |
| Al5C2 | | | | | 89.4 | 94.4 | 95.0 | 93.6 | 93.3 | | |
| Al7 | | | 94.6 | 97.7 | | | | | | | |
| Al7C0.5 | | | 95.9 | 96.4 | | | | | | | |
| Al7C1 | | 84.3 | 97.0 | 96.2 | 95.9 | | | | | | |
| Al10C1 | | 94.8 | 97.2 | | | | | | | | |
| Al12.5C1 | 78.0 | 97.7 | | | | | | | | | |
| Al12.5C1 (40 MPa) | 88.6 | | | | | | | | | | |
| Al12.5C1 (40 MPa, 4 h) | 98.1 | | | | | | | | | | |
| Al20C1 | 90.4 | | | | | | | | | | |
| B1C1 | | | | | 81.6 | 92.8 | 91.2 | 93.1 | | | |
| B1C1 (30 MPa) | | | | | | | 95.3 | 95.8 | | | |
| B1C1 (30 MPa, 2 h) | | | | | | 95.3 | 97.8 | | | | |
| B05Al1C1 | | | | | | | | 98.0 | 98.2 | 98.6 | |
| B05Al2C1 | | | 83.1 | 90.3 | 95.9 | 96.4 | | | | | |

[Modes for Carrying Out the Invention]

The SiC sintered body described above with reference to FIG. 1 will hereinafter be described.

By using the aforementioned composite powders, sintering was performed as follows.

Powders synthesized with various compositions were put in a graphite mold and were sintered at a temperature of 1550 to 2100° C. in an Ar atmosphere of 1 atm under a uniaxial pressure of 20 MPa to 40 MPa for 30 minutes by using the spark plasma sintering method (temperature rise rate: 100° C./min).

The characteristics of each SiC sintered body powder prepared by a sintering process will hereinafter be described.

The density of each SiC sintered body specimen was obtained using Archimedes' method, the theoretical density of each specimen was obtained using the rule of mixture, and then the relative density of each specimen was obtained.

The microstructure of each SiC sintered body was observed with an SEM. To properly represent the microstructure, the surface of each sintered body was polished to 1 μm. For strength measurement, each specimen was processed into a 1.5×2×25-mm bar, and strength measurement Referring to Table 4, the temperatures that produce a highest sintering density, under a 20 MPa-pressure condition, for compositions having $Al_4SiC_4$ added thereto in the amounts of 3, 5, 7, 10, and 12.5 wt %, respectively, and having 1 wt % excess carbon added thereto are 1800, 1750, 1650, 1650, and 1600° C., respectively. At lower sintering temperatures than the temperature of 1800, 1750, 1650, 1650, or 1600° C., densification may be incomplete. On the other hand, at higher sintering temperatures than the temperature of 1800, 1750, 1650, 1650, or 1600° C., a decrease in sintering density may be detected due to grain growth caused by excessive sintering. In a case in which the Al content is 0.59 wt % or less, a dense sintered body cannot be obtained, even if sintering temperature, sintering pressure, and holding time are increased to 2100° C., 40 MPa, and 2 hours, respectively. On the other hand, in the case of the Al12.5C1 composition, a dense sintered body can be obtained at a temperature of 1550° C. by increasing sintering pressure from 20 MPa to 40 MPa and increasing holding time from 30 minutes to 4 hours.

In the case of using the Al12.5C1, Al15C1, and Al20C1 compositions, relative density continued to increase to 78.0, 83.4, and 90.4%, respectively, after sintering performed at a temperature of 1550° C. under a pressure of 20 MPa. Given this, it is clear that the sintering promoting effect of the invention can be offered even by the Al20C1 composition having a sintering aid added in the total amount of 12.73 wt %.

High-temperature sintering increases the processing cost of specimens, but considerably increases the electrical conductivity of specimens, as will be described later. A dense sintered body cannot be obtained at a temperature of 1550° C. or lower under a 20 MPa-pressure condition, and at a temperature of 2100° C. or higher, problems may arise in connection with mass production. Thus, the temperature during a sintering step in accordance with the invention may be in the range of 1550 to 2100° C., which is of critical significance for a 20 MPa-pressure sintering condition, in particular, but it is obvious that minimum sintering temperature can be lowered by increasing sintering pressure.

The relative densities when the excess carbon content was increased to 0, 0.5, and 1 wt %, respectively, with the $Al_4SiC_4$ sintering aid content fixed at 3 wt % were 94.5, 94.5, and 96.1%, respectively, and this may be interpreted that excess carbon additionally promotes the sintering of SiC by removing $SiO_2$ from the surface of a SiC powder. The relative density was lower for the Al5C2 composition having excess carbon added in the amount of 2 wt % than for the Al5C1 composition having excess carbon added in the amount of 1 wt %, and the addition of excess carbon in the amount of more than 2 wt % considerably lowered sinterability. Thus, according to the invention, the mixture may preferably contain excess carbon in the amount of 0.5 to 2 wt %. During an initial sintering stage when a 3 to 5% shrinkage generally occurs, a severe deformation occurs due to high-energy ball milling, and milled particles with a fine size of several nanometers are rotated and rearranged. Since the rearrangement of particles at the initial sintering stage affects both mid-sintering and final sintering, the initial sintering stage is considered to be of critical importance. After comparing the sinterability of a powder synthesized at 360 rpm and the sinterability of a powder synthesized at 400 rpm, it is found that under a 20 MPa-pressure condition, the sintering temperature of the powder synthesized at 360 rpm is about 50° C. lower than the sintering temperature of the powder synthesized at 400 rpm. XRD analysis results show that Si remains even after a 3-day milling if the speed of milling is lower than 360 rpm. Thus, according to the invention, it may be optimal to perform milling at 360 rpm for 3 days. However, the speed and duration of milling are not particularly limited, and may preferably be set to leave only a small amount of residual Si, or no residual Si at all, after milling.

FIG. 10 is a TEM image of a SiC powder sintered under the SiCAl7C1 condition, and FIG. 11 shows EDS mapping results obtained from the Al element in the SiC powder sintered under the SiCAl7C1 condition.

Referring to FIGS. 10 and 11, Al, which is a sintering aid, is very evenly distributed in SiC powder.

Referring again to Table 1, a densified SiC sintered body with a relative density of 97% or higher can be obtained under 1650° C./20 MPa sintering conditions, simply by use of an about 5 wt % Al/C sintering aid, due to a very fine powder obtained by mechanical alloying, the formation of Si—C in an amorphous state, and a uniform distribution of the sintering aid.

FIG. 12 is an image showing the microstructure of a SiC powder sintered under 1800° C./20 MPa sintering conditions using the Al3C1 composition, and FIG. 13 is an image showing the microstructure of a SiC powder sintered under 1650° C./20 MPa sintering conditions using the Al12.5C1 composition.

Referring to FIG. 12, in a case in which 3 wt % $Si_4AlC_4$ and 1 wt % C were added as a sintering aid, sintering was possible even at a relatively low temperature of 1800° C., and as a result, the grain size of SiC was observed to be as fine as about 3 μm. Referring to FIG. 13, in a case in which the $Si_4AlC_4$ and C contents were increased to 12.5 wt % and 1 wt %, respectively, and densification was performed at a temperature of 1650° C., the grain size was reduced to 0.5 μm due to low sintering temperature.

It is known that during sintering, Al is dissolved in SiC and thus promotes a phase transition from β-SiC to α-SiC and the growth of grains in a plate shape with a high aspect ratio.

In the meantime, the 4-point bending strength of a specimen acquired by sintering a powder, obtained from the Al3C1 composition, under 1800° C./20 MPa conditions for 30 minutes was 651 MPa, which means SiC sintered at a relatively low temperature in accordance with the invention shows excellent mechanical strength. In this case, the total amount of a sintering aid added to the specimen, including about 1.8 wt % Al and 1 wt % C, was about 2.8 wt %.

That is, referring to Table 1, the use of as small an amount of sintering aid as 2.8 wt % (as in the case of the Al3C1 condition of Table 1) achieved a relative density of 97.6% even under a relatively low temperature condition, and thus, a densified SiC sintered body could be obtained. As a result, the resulting specimen exhibited a strength of as high as 651 MPa.

In a case in which the total amount of the sintering aid was increased to 5.1 wt % (as in the case of "Al7C1" of Table 1), relative density reached as high as 97.0% even under a low-temperature conditions, i.e., 1650° C./20 MPa conditions, and as a result, a densified SiC sintered body could be acquired.

As discussed above, according to the invention, a densified SiC sintered body that can be sintered at low temperature can be prepared even with the use of as small an amount of sintering aid as 2 to 5 wt %. Accordingly, a SiC sintered body with high strength can be prepared.

FIG. 14, FIG. 15, FIG. 16 and FIG. 17 show SEM and EDS analysis results obtained from specimens sintered at various temperatures while increasing the content of a sintering aid. More specifically, FIG. 14 shows analysis results obtained from a Al3C1 specimen (1800° C.-20 MPa, 30 minutes), FIG. 15 shows analysis results obtained from a Al5C1 specimen (1750° C.-20 MPa, 30 minutes), FIG. 16 shows analysis results obtained from a Al7C1 specimen (1650° C.-20 MPa, 30 minutes), and FIG. 17 shows analysis results obtained from a Al12.5C1 specimen (1600° C.-20 MPa, 30 minutes).

In a case in which the Al contents of raw material powders were 1.76, 2.93, 4.1, and 7.33 wt %, respectively, the Al contents of sintered SiC grains, analyzed with an EDS, were 0.97, 1.55, 2.58, and 4.38 wt %, respectively, which were lower than the original Al contents of the powders because during sintering, some of the Al present in the powders was segregated to grain boundaries due to dispersion. That is, it is clear that Al existed in all the specimens in the amount of more than Al's solid solubility limit in SiC grains, i.e., 0.5 wt %.

For more information on the fact that only up to 0.5 wt % Al can be contained in SiC grains due to Al's solid solubility limit, see the following article:

Tana, H., Tajima, Y. and Kingery, W. D., Solid solubility of aluminum and boron in silicon carbide. Commun. Am. Ceram. Soc., 1982, 65(2), C-27-29.

In the case of sintering a powder with high Al and B contents, more Al and B than their solid solubility limits may exist in the grains of the resulting sintered body, and this is another distinctive feature of the invention.

$B_4C$ and C have been commonly used as a sintering aid for SiC, and a relatively dense sintered body can be obtained by adding these ingredients in the amount of 1.5 to 3 wt % and performing normal sintering at 2050° C. for more than 2 hours. Sintering temperature may be lowered for pressure sintering. More specifically, the following sintering conditions are reported in the case of applying a pressure of 20 MPa: 2200° C. and 30 minutes when 1 wt % $B_4C$ is added; 2020° C. and 30 minutes when 1 wt % B and 1 wt % C are added; and 1950° C. and 20 MPa when 1 wt % $B_4C$ and 1 wt % C are added.

On the other hand, as shown in Table 4, the SiC powders prepared in accordance with the experimental example of the invention were completely densified by sintering performed under 1800° C./30 MPa conditions for two hours with the use of a 2 wt % sintering aid. Thus, it is clear that according to the invention, densification can be performed at a lower temperature than in the prior art with the addition of a given amount of sintering aid, and this is another distinctive feature of the invention.

Table 5 shows the specific resistances of SiC specimens densified with various compositions under various sintering conditions.

In recent years, research has been vigorously conducted on ways to fabricate conductive SiC. For example, studies show that the specific resistance of a SiC sintered body sintered in a nitrogen atmosphere with the use of various rare earth metals and an AlN sintering aid can be lowered to $1.5 \times 10^{-2} \Omega \cdot cm$ and SiC with a specific resistance of as low as $2.8 \times 10^{-3} \Omega \cdot cm$ can be prepared by use of a yttrium nitrate sintering aid.

In both cases, however, sintering is required to be performed at a high temperature of 2050° C. under a pressure of 20-40 MPa for as long as 6 to 12 hours. Sintering under such severe conditions inevitably causes an increase in manufacturing cost.

However, SiC specimens prepared in accordance with the invention, particularly, those sintered at a temperature of about 1750° C. under a pressure of 20 MPa for 30 minutes, exhibited very low specific resistance in the range of $10^{-4} \Omega \cdot cm$.

tance of specimens sintered at 1600° C. was in the range of about $10^{-1} \Omega \cdot cm$, which was higher than the other specimens prepared in accordance with the invention. The specimen sintered at a temperature of 2100° C. with the Al1C1 composition exhibited a low specific resistance in the range of $10^{-3} \Omega \cdot cm$ even though it was not even completely densified.

These differences in specific resistance are caused because as sintering temperature decreases, the average diameter of grains decreases, and as a result, the density of grain boundaries that serve as an insulating body increases.

On the other hand, if sintering is performed at high temperature, the density of grain boundaries that serve as an insulating body decreases due to grain growth, and thus, electrical conductivity increases. Accordingly, electrical conductivity may be controlled by the amount of sintering aid added and sintering temperature, and this is another distinctive feature of the invention.

In the case of using the Al—C composition not comprising B as a sintering aid, in order to provide high electrical conductivity, densification and grain growth need to be promoted by using a small amount of sintering aid and increasing sintering temperature to 2100° C.

In the case of using the BO5Al2C1 and B1 C1 compositions comprising B as a sintering aid, very low specific resistance in the range of $10^{-3}$ to $10^{-4} \Omega \cdot cm$ was achieved even when sintering was performed at a temperature of as low as 1700 to 1800° C., and given this, it is obvious that electrical conductivity can be considerably improved by adding a small amount of B to each specimen prepared in accordance with the invention.

It is reported that by using 1 wt % Al or B as a sintering aid for the preparation of SiC and performing sintering in an Ar atmosphere under 2050° C./20 MPa sintering conditions for 5 hours, SiC with a high specific resistance in the range of $10^3$ to $10^5 \Omega \cdot cm$ can be obtained.

This result is produced by using a similar sintering aid composition to those disclosed herein, but is at least $10^6 \Omega \cdot cm$ higher than the specific resistance of SiC prepared in accordance with the invention.

In accordance with the prior art, B and Al can be contained in SiC only in the amounts of up to B and Al's solid solubility limits of 0.1 and/or 0.5 wt %. However, as is clear in the case of the specimens prepared in accordance with the invention, at least 4.3 wt % Al, which is much higher than the Al content of SiC prepared in accordance with the prior art, can be contained in SiC grains, and as a result, the

TABLE 5

| Classification | 1600° C. | 1650° C. | 1700° C. | 1600° C. | 1750° C. | 1800° C. | 1850° C. | 1900° C. | 2100° C. |
| --- | --- | --- | --- | --- | --- | --- | --- | --- | --- |
| Al1C1 (30 MPa) | | | | | | | | | $1.2 \times 10^{-3}$ |
| Al3C1 | | | | | | | $1 \times 10^{-2}$ | $1.5 \times 10^{-2}$ | |
| Al10C1 | 0.104 | $8 \times 10^{-2}$ | | | | | | | |
| Al12.5C1 | 0.108 | | | | | | | | |
| B4C0.5Al1C1 | | | $1.4 \times 10^{-3}$ | $9 \times 10^{-4}$ | $6 \times 10^{-4}$ | | | | |
| B1C1 | | | | $1.9 \times 10^{-3}$ | | | | | |
| B1C1 (30 MPa) | | | | | $3.8 \times 10^{-3}$ | | | | |

Referring to Table 5, the specific resistance of the specimens obtained using Al and C as a sintering aid was in the range of $10^{-1}$ to $10^{-3} \Omega \cdot cm$, and the higher the sintering temperature and the smaller the amount of sintering aid used, the lower the specific resistance. The specific resiselectrical conductivity of SiC prepared in accordance with the invention can be considerably improved.

Also, electrical conductivity may be improved by promoting grain growth at high temperature so as to reduce grain boundaries that interfere with conductivity. In accordance with the invention, Si, Al, and C are synthesized by mechanical alloying, and thus, a SiC composite powder in which Al, a sintering aid, is evenly distributed can be prepared.

Accordingly, since a sintering aid can be evenly distributed in a SiC composite powder and large amounts of Al and B can be contained in SiC grains, which is impossible in the prior art, SiC can be sintered at low temperature and can provide high electrical conductivity, compared to the prior art.

Therefore, by using the sintering aid in accordance with the invention and synthesizing a single-phase SiC-based powder through the mechanical alloying of Si and C, a SiC sintered body that can be sintered at low temperature and has high electrical conductivity can be provided.

The SiC sintered body described above with reference to FIG. 32 will hereinafter be described.

By using the aforementioned composite powders, slurry processing was performed as follows.

A dispersion medium and a dispersant were mixed with each composite powder, thereby obtaining a SiC slurry.

Water or alcohol was used as the dispersion medium, and PEI or TMAH was used as the dispersant.

More specifically, the dispersion medium and the dispersant were mixed with each composite powder by dissolving a predetermined amount of the dispersant in the dispersion medium and vigorously agitating the dispersion medium along with each composite powder. To promote the dispersion of the dispersant, an ultrasonic dispersion machine was used.

In the description that follows, it is assumed that alcohol is used as a dispersant and PEI is used as a dispersion medium, unless stated otherwise.

The characteristics of a SiC slurry in accordance with the invention will hereinafter be described.

FIG. 18 is a graph showing the variation of zeta potential with PEI content, FIG. 19 is a graph showing the sedimentation behavior of slurries with different PEI contents, and FIG. 20 is a graph showing the variation, with PEI content, of the viscosity of a SiC slurry having a solids content of 55 vol %.

Referring to FIG. 18, when no dispersant was added, zeta potential had a negative value of −12 mV, but as the amount of PEI increased, the value of zeta potential became positive. Given that a slurry with a high zeta potential value is generally stably dispersed, it is clear that the addition of PEI promotes the dispersion of a SiC slurry. A highest zeta potential value was achieved by adding 1 wt % PEI, and no particular changes in zeta potential were observed once the amount of the dispersant exceeded 1 wt %.

Therefore, the amount of the dispersant may preferably be 0.5 to 2 wt % relative to 100 wt % of each composite powder.

Referring to FIG. 19, which shows the sedimentation behavior of slurries with different PEI contents, the addition of the dispersant in the amount of 1 wt % produced not only the highest zeta potential value, but also a lowest amount of sedimentation.

Referring to FIG. 20, which shows the variation, with PEI content, of the viscosity of a SiC slurry having a solids content of 55 vol %, the addition of the dispersant in the amount of 1 wt % produced not only the highest zeta potential value, but also a lowest viscosity.

Even though the SiC slurry was a high-concentration slurry, it exhibited shear thinning behavior in all cases because a weakly-coagulated powder is redispersed due to shear force generated during viscosity measurement.

FIG. 21, FIG. 22, FIG. 23 and FIG. 24 are photographs showing the microstructure of 10 wt % SiC slurries with different PEI contents. More specifically, FIG. 21 corresponds to a PEI content of 0 wt %, FIG. 22 corresponds to a PEI content of 0.5 wt %, FIG. 23 corresponds to a PEI content of 1 wt %, and FIG. 24 corresponds to a PEI content of 2 wt %.

Referring to FIG. 21, FIG. 22, FIG. 23 and FIG. 24, coagulation occurred in the SiC slurries with PEI contents of 0 and 0.5 wt %, respectively, but not in the SiC slurry with an optimum PEI content of 1 wt %. As PEI content was increased to 2 wt %, coagulation reappeared locally.

FIG. 25 is a graph showing the variation of a grain size distribution with PEI content.

Referring to FIG. 25, when no dispersant was added, there were more grains of 1.2 μm than there were grains of 170 nm, which was the original grain size, because of grain coagulation. When the amount of the dispersant was 0.5 wt %, the content of fine particles increased, the amount of coagulation decreased, but less dispersion occurred, compared to when the amount of the dispersant was 1 wt %. Once the amount of the dispersant exceeded 1 wt %, grain size distribution was no longer considerably affected by the amount of the dispersant.

FIG. 26 is a graph showing the variation of the viscosity of a slurry with solids content.

Referring to FIG. 26, as the solids content of a slurry increased, the viscosity increased, but the influence of the solids content on the viscosity was weak when the solids content was in the range of 55 vol % to 60 vol %. If the solids content was increased to 62 vol %, the viscosity increased, and the slurry exhibited shear thickening behavior, but maintained its liquidity. The 63 vol % slurry exhibited a complete shear thickening, indicating an unstable state.

FIG. 27 is a graph showing the variation of the viscosity of a 60 vol % slurry agitated and dispersed with ultrasonic waves and the variation of the viscosity of the slurry after redispersion through high-energy milling.

Referring to FIG. 27, the viscosity of the 60 vol % slurry decreased after the 60 vol % slurry was redispersed through high-energy milling, and it is believed that aggregates that failed to be effectively dispersed by ultrasonic waves were successfully dispersed during high-energy milling so as to lower the viscosity of the slurry.

(a) region of FIG. 28 shows the viscosity behavior of 60 vol % slurries prepared from SiC powders, each containing Al and C as a sintering aid, and (b) region of FIG. 28 shows the variation of the viscosity of a slurry with the content of a sintering aid at a fixed shear rate of 215.2 $s^{-1}$.

Referring to (a) region of FIG. 28, the sintering aid contents of the slurries were 0, 5.1, and 8.3 wt %, respectively, and after comparing the viscosity of the slurry with no sintering aid added with the viscosity of the slurries with the sintering aid added, it appears that the addition of the sintering aid increased viscosity, but a shear thinning phenomenon at a low shear rate and a shear thickening phenomenon at a high shear rate were both common.

At low shear rate, the structure of particles within a slurry shows a near-equilibrium shape because the thermal motion of the particles is larger than the viscosity-induced motion of the particles. Thus, agglomerates are broken by shear force, and as a result, viscosity decreases.

On the other hand, at high shear rate, the collision and interaction between the particles become active, and as a result, re-aggregation occurs. Once shear rate exceeds a particular level, the particles are transformed from a twodimensional (2D) layered structure to a three-dimensional (3D) structure, causing a shear thickening phenomenon.

Referring to (b) region of FIG. 28, the higher the content of a sintering aid in a slurry, the higher the viscosity of the slurry. A high-concentration SiC slurry with a high solids content of 60 vol % could be successfully prepared even when the total amount of a sintering aid added was 8.3 wt %.

FIG. 29 is a graph showing the variation of the viscosity of a 60 vol % slurry obtained by agitating a SiC powder, containing Al and C in the amount of 5.1 wt % as a sintering aid, and dispersing the SIC powder with ultrasonic waves and the variation of the viscosity of the slurry after redispersion through high-energy milling.

Referring to FIG. 29, the viscosity of the slurry, unlike the viscosity of pure SiC, increased after redispersion. This is believed to be because the sintering aid was newly exposed on the surface of the powder during the high-energy milling process and thus reduced the dispersion of the powder.

FIG. 30 is a graph comparing the viscosity of a commercial SiC powder and the viscosity of a 40 vol % slurry obtained from a powder synthesized by mechanical alloying in accordance with the invention.

In FIG. 30, distilled water (or a water-based dispersion medium) was used as a dispersion medium, and TMAH was used as a dispersant.

Referring to FIG. 30, when a water-based dispersion medium was used and TMAH was used as a dispersant, the viscosity of the powder synthesized by mechanical alloying in accordance with the invention was improved, compared to the commercial SiC powder.

FIG. 31 is a graph comparing the viscosities of 60 vol % slurries with various compositions.

In FIG. 31, "SC" indicates a slurry with no sintering aid contained therein, "7C1" indicates the Al7C1 composition of Table 1, and "12.5C1" indicates the "Al12.5C1" composition of Table 1.

In FIG. 31, ethanol was used as a dispersion medium, and 1 wt % PEI was used as a dispersant.

Referring to FIG. 31, it is clear that the viscosity of a slurry obtained using a sintering aid is more favorable than the viscosity of a slurry obtained without using a sintering aid, and that the viscosity characteristics of a slurry vary depending on the type of sintering aid used in the slurry.

As discussed above, as a result of the step of preparing a composite powder in accordance with the invention, SiC can be synthesized, a sintering aid, for example, Al—C, can be relatively evenly mixed into the synthesized SiC, and a SiC slurry with a high solids content can be prepared by dispersing the SiC powder with the sintering aid mixed therein.

The sintering aid may be Al—C, Al—B—C, Al—B4C—C, B—C, and/or B$_4$C—C and may be relatively evenly distributed in the synthesized SiC powder, and the content of the sintering aid in the powder may be 0.5 to 12.5 wt %.

That is, according to the invention, a composite powder can be prepared by mixing a SiC raw material and a sintering aid raw material and subjecting the mixture to mechanical alloying. Accordingly, a sintering aid for preparing a high-concentration SiC slurry can be relatively evenly distributed in a SiC powder, and thus, a high-concentration SiC slurry with a high solid content can be prepared with ease.

Studies show that SiC slurries can be prepared using various dispersants, and particularly, a high-concentration SiC slurry can be prepared using PEI and TMAH (J Zhang, Q Xu, F Ye, Q Lin, D Jiang, M Iwasa, Effect of citric acid on the adsorption behavior of polyethylene imine (PEI) and the relevant stability of SiC slurries, Colloids and Surfaces A: Physicochemical and Engineering Aspects, 276 [1-3], 168-175 (2006)).

Zhang et al. disclosed the preparation of a single-phase 57 vol % SiC slurry by use of a commercial powder having a relatively coarse grain size of 0.6 µm. On the other hand, according to the invention, a slurry with a solids content of up to 62 vol % can be prepared using a fine SiC powder with an average grain size of 170 nm. Particularly, in a case in which a sintering aid is used, a nano-SiC slurry with a solids content of up to 60 vol % can be prepared according to the invention, even when large amounts of B and C are contained in the sintering aid, whereas a slurry with a solids content of only up to 50 vol % can be prepared according to the prior art.

Exemplary embodiments of the invention have been described with reference to the accompanying drawings. However, those skilled in the art will appreciate that many variations and modifications can be made to the disclosed embodiments without substantially departing from the principles of the invention. Therefore, the disclosed embodiments of the invention are used in a generic and descriptive sense only and not for purposes of limitation.

What is claimed is:

1. A silicon carbide (SiC) sintered body, comprising:
   a sintering aid,
   wherein
   the sintering aid includes Al,
   the SiC sintered body contains 1.17 to 4.38 wt % Al in grains thereof, and
   the SiC sintered body has a specific resistance of 1 to $10^{-4}$ Ω·cm.

2. The SiC sintered body of claim 1, wherein the SiC sintered body further contains 0.1 wt % or more of B in the grains thereof.

3. A SiC slurry, comprising:
   a SiC composite powder; and
   a dispersant,
   wherein the content of the dispersant is 0.5 to 2 wt % relative to 100 wt % of the SiC composite powder,
   wherein the SiC composite powder includes a sintering aid,
   wherein the sintering aid includes Al, the SiC composite powder contains 1.17 to 4.38 wt % Al in grains, and the SiC composite powder has a specific resistance of 1 to $10^{-4}$ Ω·cm.

4. The SiC slurry of claim 3, wherein the dispersant is polyethyleneimine (PEI) or tetramethyl ammonium hydroxide (TMAH).

5. The SiC slurry of claim 3, wherein
   the SiC composite powder comprises a sintering aid, and
   the sintering aid is at least one selected from the group consisting of an Al—C-based material and an Al—B—C-based material.

6. The SiC slurry of claim 5, wherein the content of the sintering aid exceeds 0, but is not higher than 13 wt %, relative to 100 wt % of the SiC composite powder.

* * * * *